US008811321B2

(12) United States Patent
Koo et al.

(10) Patent No.: US 8,811,321 B2
(45) Date of Patent: Aug. 19, 2014

(54) METHOD FOR TRANSCEIVING A DOWNLINK REFERENCE SIGNAL, AND BASE STATION AND USER EQUIPMENT USING SAME

(75) Inventors: Ja Ho Koo, Anyang-si (KR); Moon Il Lee, Anyang-si (KR); Jae Hoon Chung, Anyang-si (KR); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 13/502,109

(22) PCT Filed: Oct. 13, 2010

(86) PCT No.: PCT/KR2010/007004
§ 371 (c)(1),
(2), (4) Date: Apr. 13, 2012

(87) PCT Pub. No.: WO2011/052911
PCT Pub. Date: May 5, 2011

(65) Prior Publication Data
US 2012/0201187 A1    Aug. 9, 2012

Related U.S. Application Data

(60) Provisional application No. 61/255,858, filed on Oct. 29, 2009.

(30) Foreign Application Priority Data

Jul. 9, 2010  (KR) ........................ 10-2010-0066191

(51) Int. Cl.
*H04W 4/00*       (2009.01)

(52) U.S. Cl.
USPC ......................................................... 370/329

(58) Field of Classification Search
USPC ............ 370/312, 328, 329; 375/299; 455/509
See application file for complete search history.

(56) References Cited

U.S. PATENT DOCUMENTS

2008/0043874 A1    2/2008  Lee et al.
2008/0063115 A1*   3/2008  Varadarajan et al. ......... 375/299

(Continued)

OTHER PUBLICATIONS

T. Lunttila et al., "EUTRAN Uplink Performance", 2nd International Symposium on Wireless Pervasive Computing, Feb. 2007.

(Continued)

*Primary Examiner* — Edan Orgad
*Assistant Examiner* — Ivan O Latorre
(74) *Attorney, Agent, or Firm* — Lee, Hong, Degerman, Kang & Waimey

(57) ABSTRACT

The present invention relates to a wireless communication system. In detail, the present invention relates to a technique for transmitting a downlink reference signal in a wireless communication system in which one base station simultaneously transmits signals to a plurality of user equipment, and a control signal containing information on the allocation of a reference signal of specific user equipment and layer information for specifying the transport layer of the specific user equipment is transmitted to the specific user equipment, wherein the information on the allocation of the reference signal contains information for indicating whether or not a reference signal pattern, other than the reference signal pattern in which the reference signal of the specific user equipment is multiplexed, is transmitted in a predetermined resource region.

10 Claims, 15 Drawing Sheets

(56) References Cited

U.S. PATENT DOCUMENTS

2008/0225960 A1     9/2008  Kotecha et al.
2008/0298502 A1*   12/2008  Xu et al. ................... 375/299
2008/0316957 A1*   12/2008  Shen et al. ................. 370/328
2009/0154588 A1*    6/2009  Chen et al. ................. 375/267
2010/0272032 A1*   10/2010  Sayana et al. .............. 370/329
2011/0206147 A1*    8/2011  Hariharan et al. ........... 375/260
2012/0106472 A1*    5/2012  Rosa et al. ................. 370/329

OTHER PUBLICATIONS

B. Classon et al., "Overview of UMTS Air-Interface Evolution", IEEE 64th Vehicular Technology Conference, Sep. 2006.

* cited by examiner

METHOD FOR TRANSCEIVING A DOWNLINK REFERENCE SIGNAL, AND BASE STATION AND USER EQUIPMENT USING SAME

CROSS-REFERENCE TO RELATED APPLICATIONS

This application is the National Stage filing under 35 U.S.C. 371 of International Application No. PCT/KR2010/007004, filed on Oct. 13, 2010, which claims the benefit of earlier filing date and right of priority to Korean Application No. 10-2010-0066191, filed on Jul. 9, 2010, and also claims the benefit of U.S. Provisional Application Ser. No. 61/255,858, filed on Oct. 29, 2009, the contents of which are all incorporated by reference herein in their entirety.

FIELD OF THE INVENTION

The present invention relates to a wireless communication system. And, more particularly, to a method for transceiving a downlink reference signal, and base station and user equipment using the same.

BACKGROUND ART

Recently, in order to maximize the performance of the wireless communication system and the communication capacity, Multiple Input Multiple Output (MIMO) systems have been drawing a great deal of attention. The MIMO technology corresponds to an evolved version of the conventional communication technology using a single transmission antenna and a single reception antenna, and the MIMO technology applies multiple transmission antennas and multiple reception antennas, so as to enhance the transmitted and/or received (or transceived) data transmission efficiency. Herein, a MIMO system may also be referred to as a multiple antenna system. The MIMO technology applies the technology of receiving a plurality of segmented data fragments being transmitted through multiple antennas and completing the received message by grouping the collected data fragments, instead of relying on a single antenna path, in order to receive a single full message. As a result, the data transmission rate may be enhanced within a predetermined range, or a system range may be increased with respect to a specific data transmission rate.

The MIMO technology may include transmit diversity, spatial multiplexing, and beamforming. Herein, transmit diversity corresponds to a technology of transmitting the same type of data through multiple transmission antennas, so as to enhance the transmission reliability. Also, spatial multiplexing corresponds to a technology of having different types of data being transmitted at the same time through multiple antennas, thereby being capable of transmitting data at a fast transmission rate, without having to increase the system bandwidth. Moreover, beamforming is used for increasing an SINR (Signal to Interference, plus Noise Ratio) of a signal by adding a weight respective to a channel state (or status) in a multiple antennas system. At this point, the weight may be expressed as a weight vector or a weight matrix, and this may also be referred to as a precoding vector or a precoding matrix.

Also, spatial multiplexing may include spatial multiplexing respective to a single user and spatial multiplexing respective to a plurality of users. Accordingly, spatial multiplexing may also be referred to as a single user MIMO, and spatial multiplexing respective to a plurality of users may also be referred to as SDMA (Spatial Division Multiple Access) or Multi User MIMO.

The capacity of a MIMO channel increases in proportion to the number of antennas. The MIMO channel may be separated (or divided) to independent channels. When the number of transmission antennas is referred to as $N_t$, and when the number of reception antennas is referred to as $N_r$, the number of independent channels $N_i$ becomes $N_i = \min\{N_t, N_r\}$. Each of the independent channels may be referred to as a spatial layer. As a non-zero eigenvalue of a MIMO channel matrix, a rank may be defined by a number of spatial streams that can be multiplexed.

As shown in the example of a single user MIMO shown in FIG. 1, the single user MIMO corresponds to a structure wherein multiple data streams, each being different from one another, transmitted from the base station are all transmitted to a single user. In case of the single user MIMO, a MIMO channel consists of one transmitter and one receiver. In case of the single user MIMO, one user may receive all of the transmitted signals. Therefore, in case of the single user MIMO, only the data respective to a single user are scheduled to the same time/frequency domain(s). Conversely, as shown in the example of a multiple-user MIMO shown in FIG. 2, the multiple-user MIMO respectively transmits the multiple data streams, each being different from one another and being transmitted from the base station, to the plurality of users. In case of the multiple-user MIMO, one transmitter and multiple receivers collectively configure the MIMO channel. Therefore, in case of the multiple-user MIMO, the data respective to the plurality of users may be collectively scheduled to the same time/frequency domain(s).

In order to allow the user equipment to demodulate the data allocated (or assigned) to a predetermined time/frequency domain, the user equipment uses a reference signal (RS), which is transmitted from the base station, so as to perform a channel estimate (or channel estimation) for estimating the configuration and channel quality of a physical channel, which is used for the data transmission. The method for estimating a channel and the reference signal will hereinafter be described in detail. In order to detect a synchronization signal, the receiver is required to be aware (or informed) of information (e.g., attenuation, phase deviation, time delay, and so on) on a radio channel. At this point, channel estimation refers to a process of estimating the size and reference phase of a carrier (or carrier wave). A radio channel environment has a fading characteristic, wherein a channel status chronologically and irregularly changes within time and frequency domains. Herein, the process of estimating an amplitude and phase respective to such channel is referred to as channel estimation. More specifically, channel estimation refers to a process of estimating a frequency response of a radio section or radio channel. Herein, the method for performing channel estimation includes a method of estimating a reference value based upon the reference signal of several base stations by using a two-dimensional channel estimator. At this point, a reference signal refers to a symbol not including any actual data, in order to support (or help) the processes of carrier phase synchronization and base station information acquisition (or reception), yet yielding a high output. A transmitting end and a receiving end may perform channel estimation by using the above-described reference signal. The channel estimation process, which is performed by using the above-described reference signal, refers to a process of estimating a channel by using a reference signal, which is commonly known by the transmitting end and the receiving end, and of recovering data by using the estimated value.

In the multiple-user MIMO, in order to demodulate the transmission data, each of the user equipment is required to be capable of using the acquired channel information, which is received from the base station through the reference signal, so as to separate (or divide) each transmission layer, which is used for transmitting data to each of the corresponding user equipment. In order to do so, the base station is required to signal reference signal allocation information respective to each reference signal being allocated to each of the corresponding user equipment.

DETAILED DESCRIPTION OF THE INVENTION

Technical Objects

The present invention provides a method and apparatus for transmitting information required for allowing user equipment, which operate in multiple-user MIMO, to efficiently demodulate transmission data.

Additionally, the present invention also provides a method and apparatus for transmitting information that can identify reference signals allocated to each of the user equipment.

Furthermore, the present invention provides a method for performing demodulation of transmission data by using reference signal allocation information, which is transmitted from the base station, and a user equipment performing the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

According to an aspect of the present invention, a method for transmitting, by a base station simultaneously transmitting a signal to a plurality of user equipment, a downlink reference signal to a user equipment in a wireless communication system is provided. The method comprises: transmitting a control signal including allocation information on a reference signal of the user equipment and layer information specifying a transmission layer of the user equipment; and transmitting one or more reference signal patterns, in which reference signals of the plurality of user equipment are multiplexed, on a predetermined resource area, wherein the reference signal allocation information includes information indicating whether or not another reference signal pattern other than a reference signal pattern having the reference signal of the user equipment multiplexed therein is being transmitted on the predetermined resource area.

According to another aspect of the present invention, a base station of transmitting a downlink reference signal to a user equipment in a wireless communication system, the base station simultaneously transmitting a signal to a plurality of user equipment is provided. The base station comprises: a transmitter configured to transmit signals to the plurality of user equipment; and a processor configured to control the transmitter to transmit a control signal including allocation information of a reference signal for the user equipment and layer information specifying a transmission layer of the user equipment; and to control the transmitter to transmit one or more reference signal patterns, in which reference signals of the plurality of user equipment are multiplexed, on a predetermined resource area. Herein, the reference signal allocation information includes information indicating whether or not another reference signal pattern other than a reference signal pattern having the reference signal for the user equipment multiplexed therein is being transmitted on the predetermined resource area.

According to yet another aspect of the present invention, a method for receiving a downlink reference signal in a wireless communication system having multiple user equipment simultaneously receiving signals transmitted from a base station is provided. The method comprises: receiving a control signal from the base station, the control signal including allocation information on a reference signal of the user equipment and layer information specifying a transmission layer of the user equipment; and, receiving one or more reference signal patterns, in which reference signals of the plurality of user equipment are multiplexed, on a predetermined resource area. Herein, the reference signal allocation information includes information indicating whether or not another reference signal pattern other than a reference signal pattern having the reference signal of the user equipment multiplexed therein is being transmitted on the predetermined resource area.

According to a further aspect of the present invention, a user equipment of receiving a downlink reference signal in a wireless communication system having a plurality of user equipment simultaneously receive signals transmitted from a base station is provided. The user equipment comprises: a receiver configured to receive a control signal from the base station, the control signal including allocation information on a reference signal of the user equipment and layer information specifying a transmission layer of the user equipment; and configured to receive one or more reference signal patterns, in which reference signals of the plurality of user equipment are multiplexed, on a predetermined resource area, and a processor configured to control the receiver to receive the control signal and the one or more reference signal patterns; and configured to decide, based on the reference allocation information, whether or not another reference signal pattern, other than a reference signal pattern having the reference signal of the user equipment multiplexed therein, is transmitted.

In each aspect of the present invention, the reference signal allocation information may include information indicating a number of resource elements occupied per reference signal pattern and/or information indicating a length of an orthogonal cover used for multiplexing the reference signals of the plurality of user equipment.

In each aspect of the present invention, the layer information may include a number of transmission layers being used by the specific user equipment and information indicating a starting transmission layer being used by the specific user equipment.

In each aspect of the present invention, the control signal may include information indicating a total number of transmission layers being used by the plurality of user equipment.

In each aspect of the present invention, the control signal may include information indicating a maximum number of resource elements available for transmitting reference signals of the plurality of user equipment.

In each aspect of the present invention, the user equipment may perform null-processing on resource elements having another reference signal pattern allocated thereto and may perform demodulation on the processed resource elements.

The technical objects of the present invention merely correspond to a portion of the exemplary embodiments of the present invention. Therefore, various embodiments of the present invention reflecting the technical characteristics of the present invention may be devised and understood by anyone skilled in the art based upon detailed description of the present invention, which will be provided below.

Effects of the Invention

According to the exemplary embodiments of the present invention, by having the user equipment eliminate all ambiguity that may occur during the process of demodulating transmission data based upon the reference signal, the present invention may prevent the loss in the demodulation performance from occurring.

Also, by providing each user equipment with information that can identify a reference signal being allocated to the corresponding user equipment, each transmission layer of the user equipment may be effectively identified.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
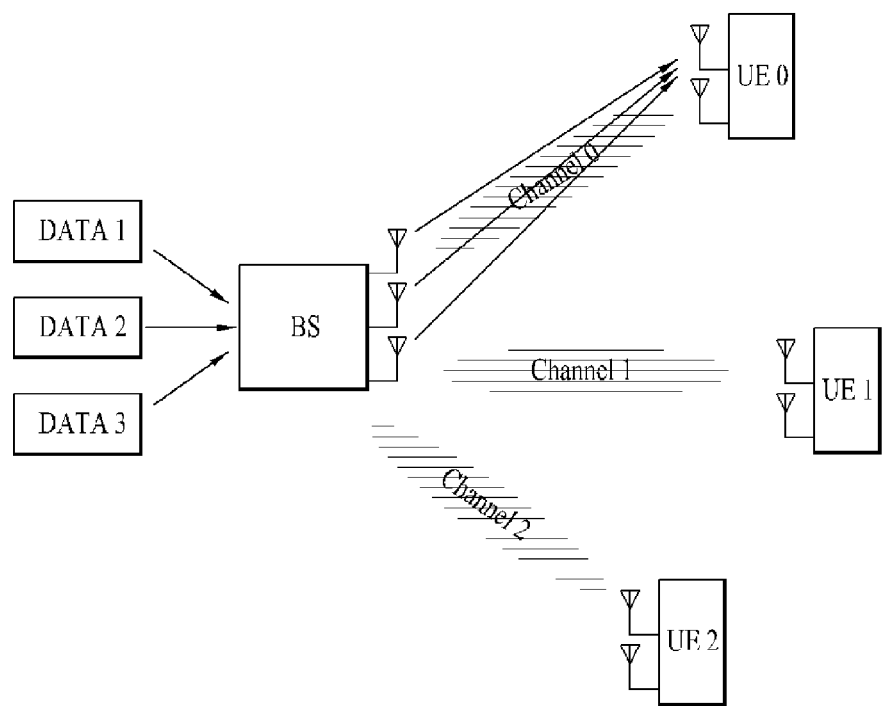
FIG. 1 illustrates an example of a single-user MIMO.
Figure 2:
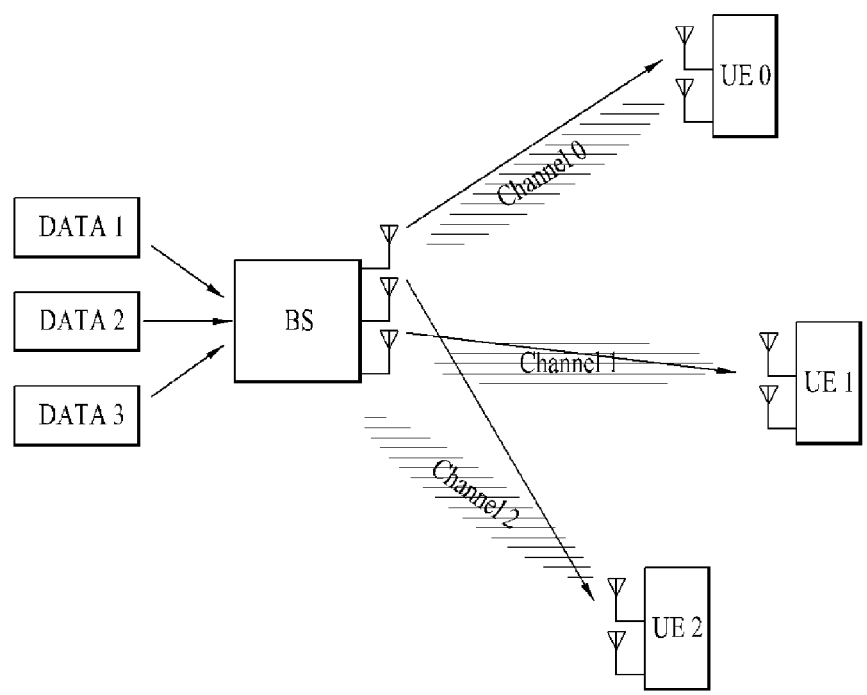
FIG. 2 illustrates an example of a multiple-user MIMO.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

A wireless communication system, to which the present invention may be applied, includes at least one Base Station (BS) (11). Each base station provides a communication service to a User Equipment (UE), which is located in a specific geological region (generally referred to as a cell). The user equipment may either be fixed or be mobile. And, various devices (or equipment) communicating with the base station so as to transceive (or transmit and/or receive) user data and/or various control information may correspond to the user equipment. The term user equipment may also be referred to as Terminal Equipment, MS (Mobile Station), MT (Mobile Terminal), UT (User Terminal), SS (Subscribe Station), wireless device, PDA (Personal Digital Assistant), wireless modem, handheld device, and so on. A base station generally refers to a fixed station, which communicates within a user equipment and/or another base station, and the base station communicates with the user equipment and another base station, so as to exchange various data and control information to and from one another. The term base station may also be referred to as eNB (evolved-Node B), BTS (Base Transceiver System), Access Point, and so on.

Figure 3:
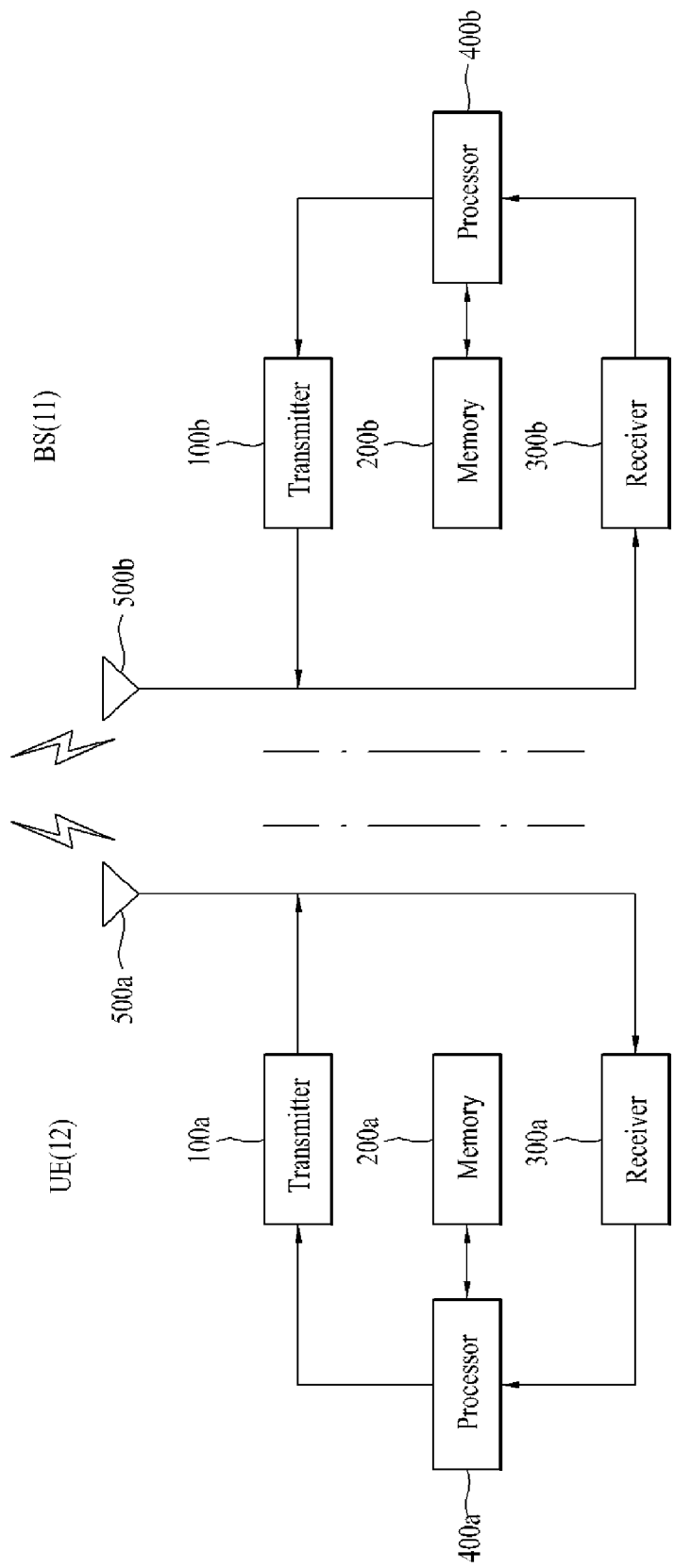
FIG. 3 illustrates a block view showing elements configuring a user equipment and base station performing the method according to the present invention.

FIG. 3 illustrates a block view showing elements configuring a user equipment and base station performing the method according to the present invention.

The user equipment (12) operates as a transmitting device in an uplink and operates as a receiving device in a downlink. The base station (11) operates as a receiving device in an uplink and operates as a transmitting device in a downlink.

Each of the user equipment (12) and the base station (11) includes antenna(s) (500a, 500b) that can receive information and/or data, signals, messages, and so on, a Transmitter (100a, 100b) transmitting messages by controlling the antenna(s), a Receiver (300a, 300b) receiving messages by controlling the antenna(s), and a memory (200a, 200b) storing various information related to communication within the wireless communication system. Also, each of the user equipment (12) and the base station (11) includes a processor (400a, 400b), which is configured to perform the present invention by controlling the elements included in the user equipment (12) and the base station (11), such as the transmitter and the receiver, and the memory, and so on. The transmitter (100a), the receiver (300a), the memory (200a), and the processor (400a) included in the user equipment (12) may each be implemented as independent elements by using separate chips, or a combination of at least two or more elements may be implemented by using a single chip. Similarly, the transmitter (100b), the receiver (300b), the memory (200b), and the processor (400b) included in the base station (11) may each be implemented as independent elements by using separate chips, or a combination of at least two or more elements may be implemented by using a single chip. The transmitter and receiver may also be combined so as to be implemented as a single transceiver within the user equipment or the base station.

The antenna (500a, 500b) performs the function of transmitting a signal, which is generated from the transmitter (100a, 100b), to an outside target, or the antenna(s) (500a, 500b) performs the functions of receiving a radio signal from an outside source and delivering the received radio signal to the receiver (300a, 300b). In case of a transceiving module supporting the Multi-Input Multi-Output (MIMO) function, which transmits and receives data by using multiple antennas, the transceiving module may be connected to 2 or more antennas.

The processor (400a, 400b) generally controls the overall operations of each module within the user equipment (12) or the base station (11). Most particularly, the processor (400a, 400b) may perform various control functions for performing the present invention, MAC (Medium Access Control) frame variable control functions respective to service characteristics and frequency environments, power saving mode functions for controlling idle mode operations, Hand Over functions, certification and encryption functions, and so on. The processor (400a, 400b) may also be referred to as a controller, a microcontroller, a microprocessor, a microcomputer, and so on. Meanwhile, the processor (400a, 400b) may be implemented in the form of hardware or firmware, or software, or in a combination of at least two or more of hardware, firmware, and software. In case of implementing the embodiments of the present invention by using hardware, ASICs (Application Specific Integrated Circuits) or DSPs (Digital Signal Processors), DSPDs (Digital Signal Processing Devices), PLDs (Programmable Logic Devices), FPGAs (Field Programmable Gate Arrays), and so on, which are configured to perform the present invention, may be provided in the processor (400a, 400b). Meanwhile, in case of implementing the embodiments of the present invention by using firmware or software, the firmware or software may be configured to include a module, procedure, or function performing the above-described functions or operations, and the firmware or software, which is configured to perform the present invention may be provided in the processor (400a, 400b), or may be stored in the memory (200a, 200b) so as to be operated by the processor (400a, 400b).

The transmitter (100a, 100b) performs coding and modulation on signals and/or data that are to be scheduled by the processor (400a, 400b) or by a scheduler being connected to the processor, so as to be transmitted to an outside target and, then, transmits the processed signals and/or data to the antenna (500a, 500b). For example, the transmitter (100a, 100b) converts a data sequence that is to be transmitted to K number of signal sequences by performing demultiplexing, channel encoding, and modulation processes. The K number of signal sequences passes through a transmission processor included in the transmitter, so as to be transmitted through the transmitting antenna (500a, 500b). The transmitter (100a, 100b) and the receiver (300a, 300b) of the user equipment (12) and the base station (11) may each be differently configured depending upon the procedures for processing the transmission signal and the reception signal.

Figure 4:
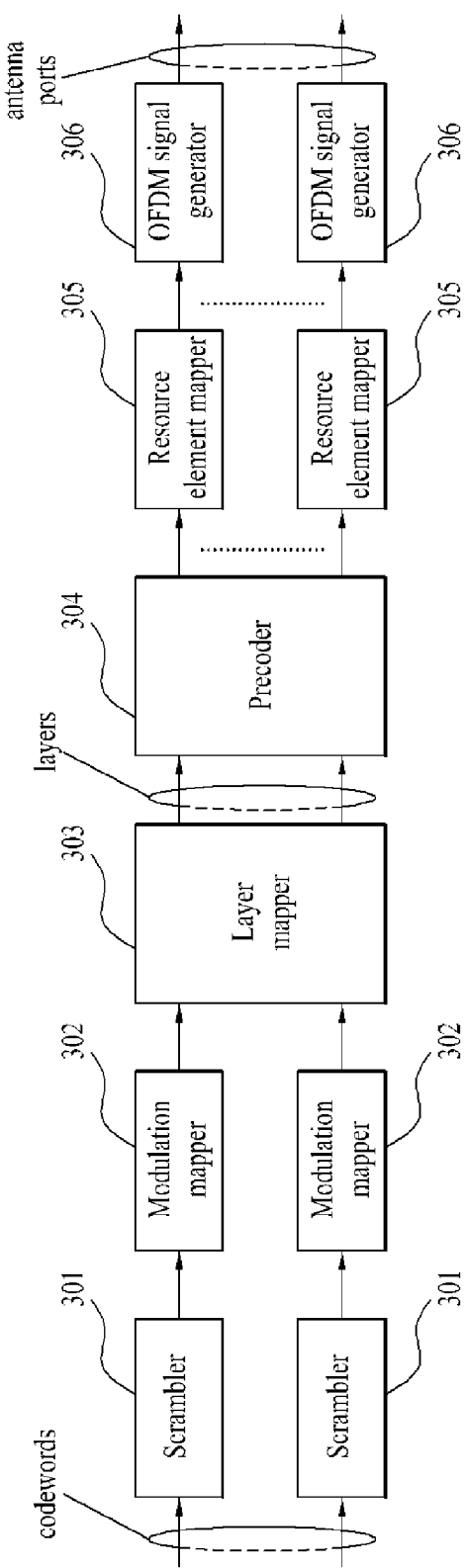
FIG. 4 illustrates a signal processing procedure in accordance with an OFDMA (Orthogonal Frequency Division Multiple Access) method.

FIG. 4 illustrates a signal processing procedure in accordance with an OFDMA (Orthogonal Frequency Division Multiple Access) method.

The transmitter included in the user equipment or the base station may transmit at least one or more codewords. The at least one or more codewords may each be scrambled by a scrambler (301) and may each be modulated to complex symbols by a modulation mapper (302). A layer mapper (303) maps the complex symbols to at least one or more transmission layers, and a precoder (304) multiplies complex symbols of a transmission layer by a predetermined precoding matrix W, which is selected in accordance with a channel status, so as to output complex symbols for each antenna. The precoder (304) may use both of a codebook method and a non-codebook method. The complex symbols for each antenna are respectively mapped to time-frequency resource elements, which are to be used for transmitted, by a resource element mapper (305), and the complex symbols for each antenna that are mapped to the respective time-frequency resource elements are modulated by an OFDM signal generator (306) by using an OFDM method, thereby being transmitted to each antenna port in the form of OFDM symbols for each antenna port. The OFDM signal generator may perform IFFT (Inverse Fast Fourier Transform) on an input symbol, and a CP (cyclic prefix) may be inserted in a time domain symbol being processed with IFFT. The OFDM symbol is transmitted through each antenna.

For reference, since the OFDMA method can increase frequency efficiency and cell capacity, the OFDMA method is most frequently used for downlink transmission. However, the OFDMA method may also be used for uplink transmission.

In FIG. 4, among the various signal processing procedures, the OFDMA (Orthogonal Frequency Division Multiple Access) method is given as an example and described accordingly. However, the user equipment may also process an uplink signal by using an SC-FDMA (Single Carrier Frequency Division Multiple Access) method and transmit the processed uplink signal to the base station. The transmitter of the SC-FDMA method may include 1 scrambler (301), 1 modulation mapper (302), a precoder (304), and 1 resource element mapper (305). The scrambler (301) of the user equipment may use a user equipment specific scrambling signal so as to scramble a transmission signal, and the modulation mapper (302) modulates the scrambled signal to a complex signal by using a BPSK method, a QPSK method, or a 16 QAM method, depending upon the type of transmission signal and/or channel status. The modulated complex signal is then precoded by the precoder (304), and the precoded complex signal is mapped to time-frequency resource elements, which are to be used for an actual transmission, by the resource element mapper (305). The signal that is mapped to the resource elements may be transmitted to the base station through the antenna in the form of an SC-FDMA signal. The user equipment adopting the SC-FDMA signal processing method may be provided with an SC-FDMA signal generator, which converts the signal being mapped to the resource element to an SC-FDMA signal.

For reference, the user equipment may be implemented to adopt both the OFDMA method and the SC-FDMA signal processing method. And, the user equipment may also be designed to use both methods by switching from the OFDMA method to the SC-FDMA method, and vice versa, depending upon the channel environment.

In FIG. 4, the transmitter (100a, 100b) is described to be equipped with a scrambler (301), a modulation mapper (302), a layer mapper (303), a precoder (304), a resource element mapper (305), and an OFDM signal generator (306). However, the processor (400a, 400nb) may be designed to be equipped with the above-described operation modules. The transmitter (100a, 100b) and the receiver (300a, 300b) may be configured to modulate the OFDM symbol signal to an RF (radio frequency) signal and to transfer the modulated RF signal to the antenna (500a, 500b).

Figure 5:
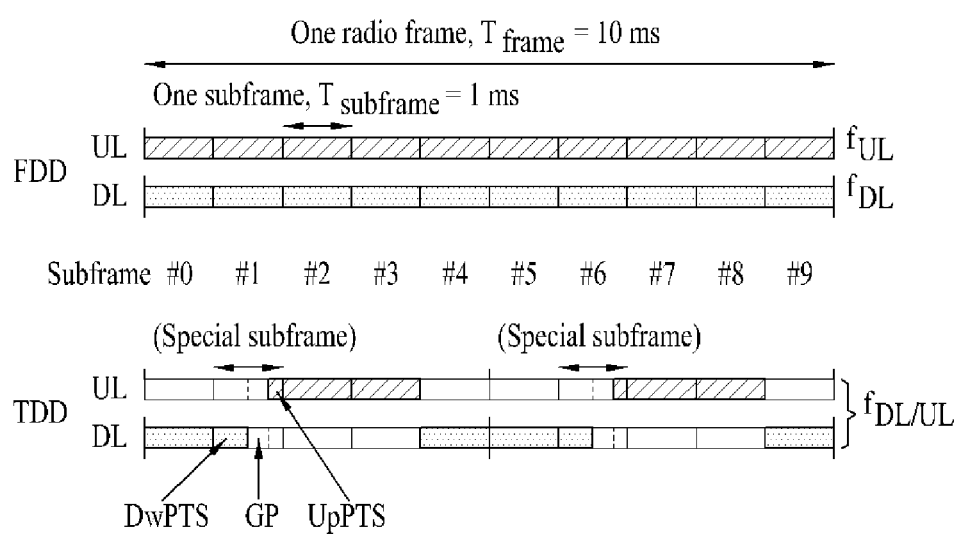
FIG. 5 illustrates a structure of a radio frame.

FIG. 5 illustrates a structure of a radio frame.

Referring to FIG. 5, a radio frame is configured of 10 subframes. Herein, the time consumed for transmitting one subframe is referred to as a TTI (Transmission Time Interval).

Depending upon the method of transmitting downlink and uplink data, a radio frame may be categorized as a Frequency Division Duplex (FDD) type and a Time Division Duplex (TDD) type. In case of the FDD type radio frame, uplink transmission and downlink transmission are simultaneously performed through different frequency bands. And, in case of the TDD type radio frame, uplink transmission and downlink transmission are performed at different time periods using the same frequency band.

Herein, the above-described radio frame structure is merely exemplary. And, therefore, the number of subframes being included in the radio frame, the number of slots being included in a subframe, or a number OFDM symbols being included in a slot may be variously varied.

Figure 6:
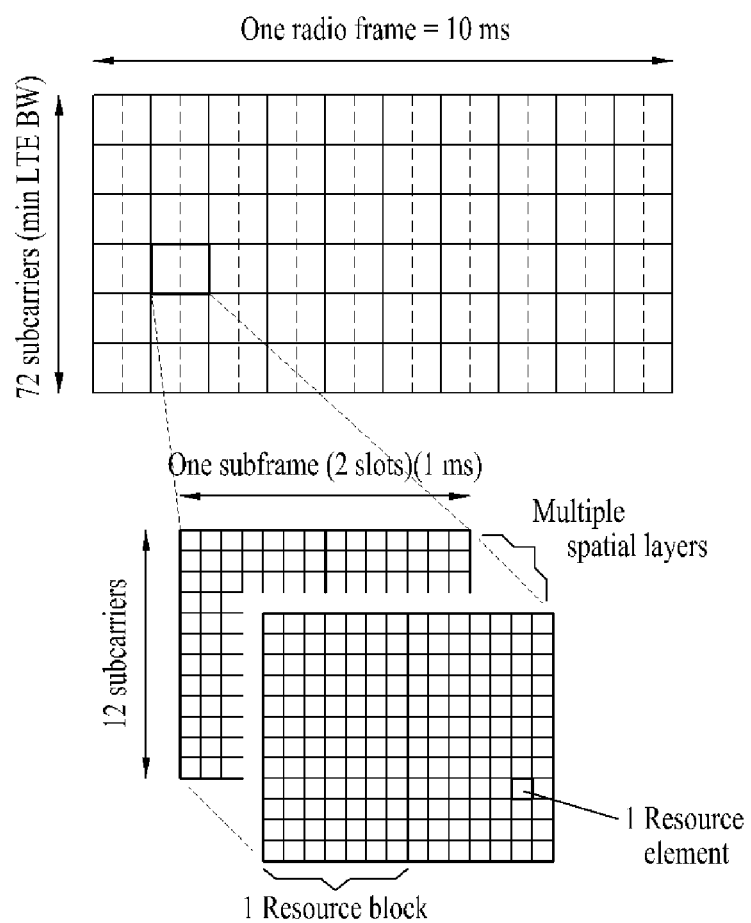
FIG. 6 illustrates a structure of a subframe configuring a radio frame.

FIG. 6 illustrates a structure of a subframe configuring a radio frame.

One subframe includes 2 consecutive slots. For example, the length of one subframe may be equal to 1 ms, and the length of one slot may be equal to 0.5 ms. When a normal CP (Cyclic Prefix) is configured in the corresponding cell, each slot may be configured to include 7 OFDM symbols. And, when an extended CP is configured in the corresponding cell, each slot may be configured to include 6 OFDM symbols.

In the frequency domain, the resources may be grouped to 12 subcarrier units. Each group being configured of 12 subcarriers within 1 slot is referred to as a Resource Block (RB). The smallest unit of a resource corresponds to a Resource Element (RE), which is configured of 1 subcarrier and 1 symbol. And, in case of the normal CP, 1 resource block includes 84 resource elements. And, in case of the extended CP, 1 resource block includes 72 resource elements.

FIG. 6 illustrates an exemplary subframe structure of a normal CP, wherein 1 resource block included in a subframe includes 84 resource elements. For reference, a pair of consecutive resource blocks may correspond to a basic resource allocation unit.

Meanwhile, transmission resources may be identified (or differentiated) not only by time and frequency but also by space. Herein, different streams that are generated by spatial multiplexing may be referred to as spatial layers. Spatial multiplexing may be realized by multiple antennas transmission and reception. A spatial layer, in other words, transmission layer (hereinafter referred to as layer) may be illustrated and described to map a symbol to a transmission antenna port. And, each layer may be identified by a precoding vector having the same size as the number of antennas. Also, each layer may be correlated to a radiation pattern. Herein, the number of transmitted layers may also be referred to as a transmission "rank". For reference, in the current LTE system, two layers per codeword may be used.

For reference, a maximum of 3 foremost OFDM symbols of the first slot within a downlink subframe corresponds to a control region to which a PDCCH (Physical Downlink Control Channel) is allocated. And, the remaining OFDM symbols correspond to a data region to which a PDSCH (Physical Downlink Shared CHannel) is allocated. In addition to the PDCCH, other control channels, such as a PCFICH (Physical Control Format Indicator CHannel), PHICH (Physical Hybrid ARQ Indicator Channel), and so on, may be allocated to the control region. The user equipment decodes the control information that is being transmitted through the PDCCH, thereby being capable of reading data information, which is being transmitted through the PDSCH. Herein, the control region including 3 OFDM symbols is merely exemplary. The number of OFDM symbols being included in the control region within the subframe may be known through the PCFICH.

As a downlink channel carrying main data, the PDSCH may be used not only for the transmission of broadcast channels, which are not transmitted on the PBCH (Physical Broadcast CHannel), but also for the transmission of all types of user data. The user data may be transmitted over the PDSCH in transmission units referred to as transport blocks. Each transport block corresponds to a MAC-layer protocol data unit. When the PDSCH is used for transmitting user data, one or two transport blocks per user equipment may be transmitted for each subframe. A phase reference for demodulating the PDSCH may be provided by a Reference Signal (RS). Resource elements excluding the resource elements, which are reserved for other purposes, such as reference signals, synchronization signals, PBCH and control signaling, may be allocated to the PDSCH.

Downlink reference signals may be classified into a cell-specific RS, a user equipment specific RS, and an MBSFN specific RS. The cell-specific RS corresponds to a signal that may be used in all user equipment existing in the corresponding cell, and may also be referred to as a common RS. The user equipment specific RSs (hereinafter referred to as a UE-specific RSs) correspond to a signal that may be transmitted for decoding data respective to specific user equipment. The UE-specific RS may be transmitted through a resource block pair, to which PDSCH belongs, the PDSCH having data respective to the specific user equipment transmitted thereto. The MBSFN-specific RS may be used for MBSFN (Multimedia Broadcast Single Frequency Network) operations.

In the base station, an RS pattern is defined with respect to multiple antenna ports. An antenna port may be realized by one physical transmission antenna or by a combination of multiple physical transmission antenna elements. In any of the above-described cases, the RS being transmitted from any of the given antenna port enables the user equipment to perform channel estimation with respect to the corresponding antenna port. In case of a system that can use up to N number of cell-specific antenna ports, the user equipment may perform N number of independent channel estimation processes. Herein, a different RS pattern may be defined for each antenna port.

In addition to the cell-specific RS, which is being transmitted with respect to all user equipment included in the cell, a UE-specific RS may also be transmitted. The UE-specific RS is recognized as to be transmitted by using a separate antenna port. When a UE-specific RS is transmitted, the user equipment uses the transmitted UE-specific RS in order to be capable of performing channel estimation for demodulating data within the corresponding PDSCH resource block. A typical exemplary usage of the UE-specific RS corresponds to allowing data being transmitted to a specific user equipment to be demodulated by using a beamforming method. The base station uses an array of neighboring antenna elements so as to create a beam along the direction of a specific user equipment. By adequately changing the phase of signals from different antenna elements, the corresponding signals are added, thereby forming a beam along the direction of the specific user equipment, and the specific user equipment may be capable of receiving data being transmitted through the formed beam. However, the user equipment is unaware of whether the data are being received by the beamforming method or whether the data are being received through a full cell transmission method. And, a phase-adjusted array of the antenna port is shown to (or recognized by) the user equipment as a single antenna. Even though the user recognizes the data being transmitted by the beamforming method as data being transmitted from a single antenna, the channel quality experienced by the user equipment is inevitably different from the channel quality respective to an antenna port, which is identified by the cell-specific RS. Therefore, apart from the cell-specific RS, a reference signal, which is defined in accordance with the combination of antenna elements used for beamforming, is required to be transmitted to the corresponding user equipment. After receiving the UE-specific RS, the user equipment may demodulate the beamformed data by using the UE-specific RS and not the cell-specific RS.

In order to accurately demodulate the reception data (or received data), the user equipment should be capable of dividing each layer that is used for transmitting data to the user equipment by using the RS. However, unlike the single-user MIMO, in case of the multiple-user MIMO, array information respective to multiple user equipment may be multiplexed to a single RS pattern. Therefore, the base station is required to provide information that may be used for dividing the layer respective to each user equipment to the corresponding user equipment.

Additionally, among the resource elements that may be allocated for the entire UE-specific RS(s), a portion of the resource elements may be used for RS pattern A, which is respective to an array that is used for beamforming to user equipment X, and the other (or remaining) resource elements may be used for RS pattern B, which is respective to an array that is used for beamforming to user equipment Y. In this case, when the user equipment X interprets that the PDSCH has been allocated to resource elements other than RS pattern A, and, therefore, when the user equipment X demodulates RS pattern B by using the same method for demodulating the PDSCH, the demodulation performance may be degraded. In order to perform an accurate demodulation process, a specific user equipment should interpret that the resource elements, having an RS pattern designated for another user equipment allocated thereto, are transmitted while being assigned with a null value. Thereafter, the specific user equipment should process the received data accordingly. In order to do so, the specific user equipment should be aware of whether or not an RS pattern other than the RS pattern having its own transmission layers multiplexed thereto exists. Therefore, considering a case when the multiple-user MIMO may be applied, each of the user equipment should be provided with information on a rank and layer used by each user equipment, information on whether or not an RS pattern other than the RS pattern having layers of the corresponding user equipment multiplexed thereto exists.

Figure 7:
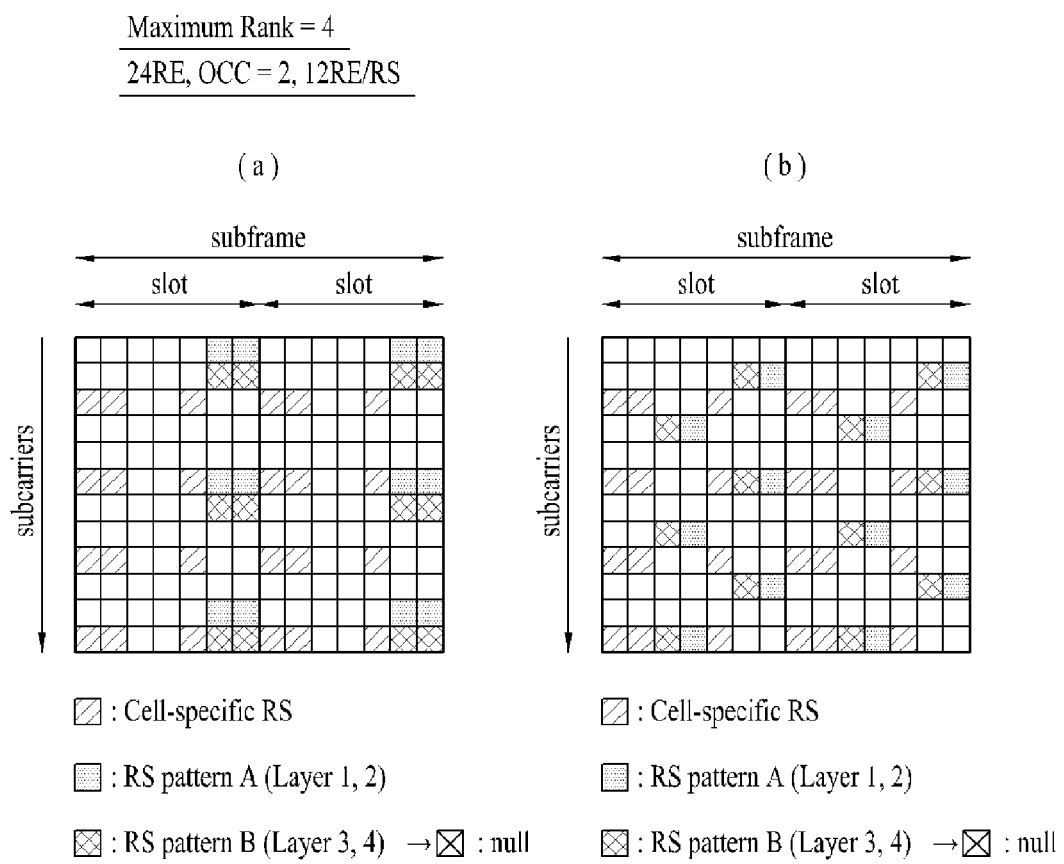
FIG. 7 to FIG. 13 respectively illustrate exemplary UE-specific RS patterns.
Figure 8:
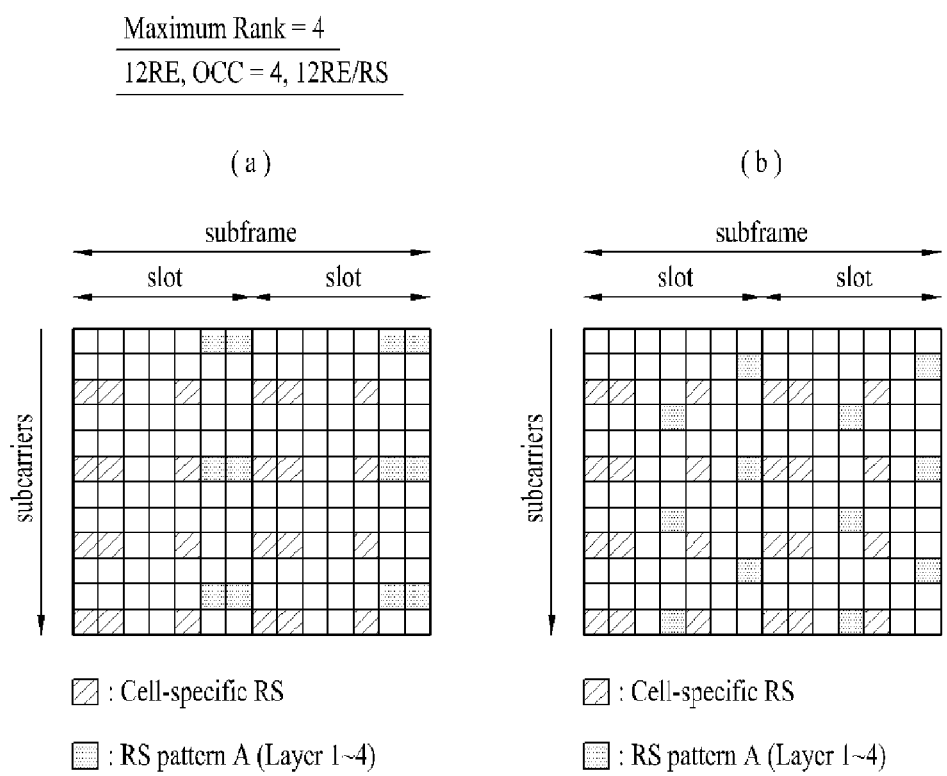
Figure 9:
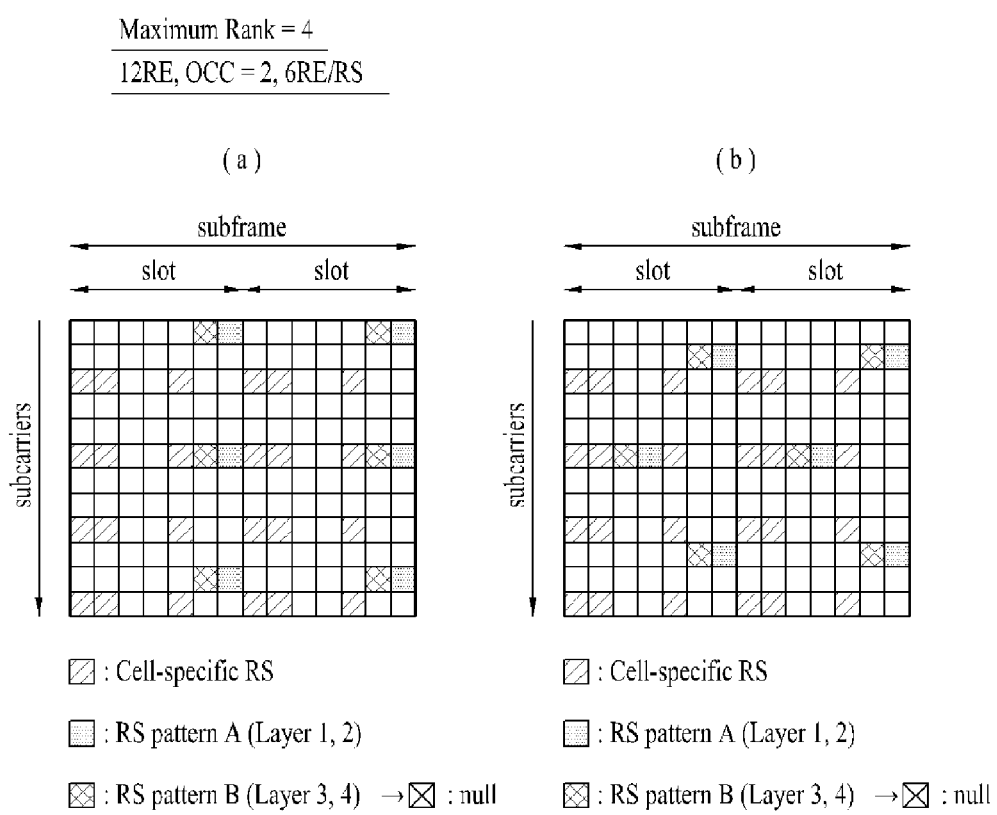
Figure 10:
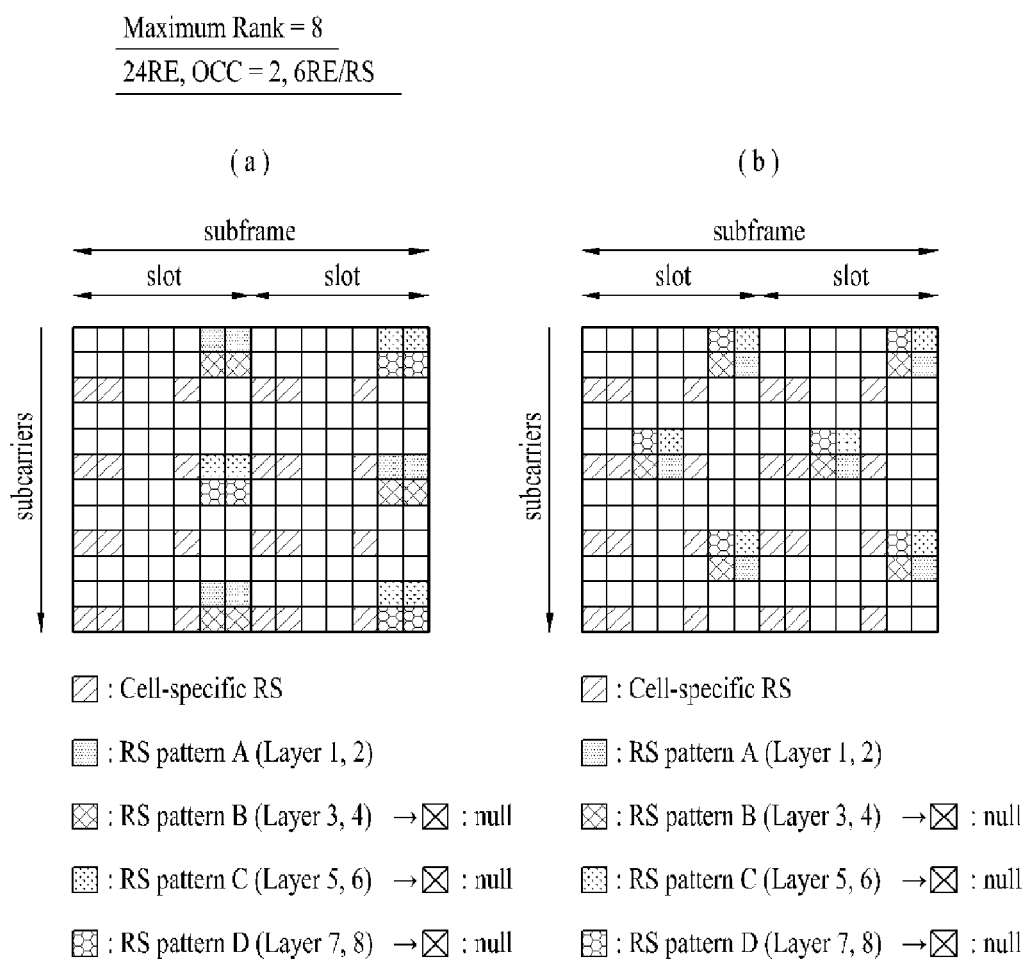
Figure 11:
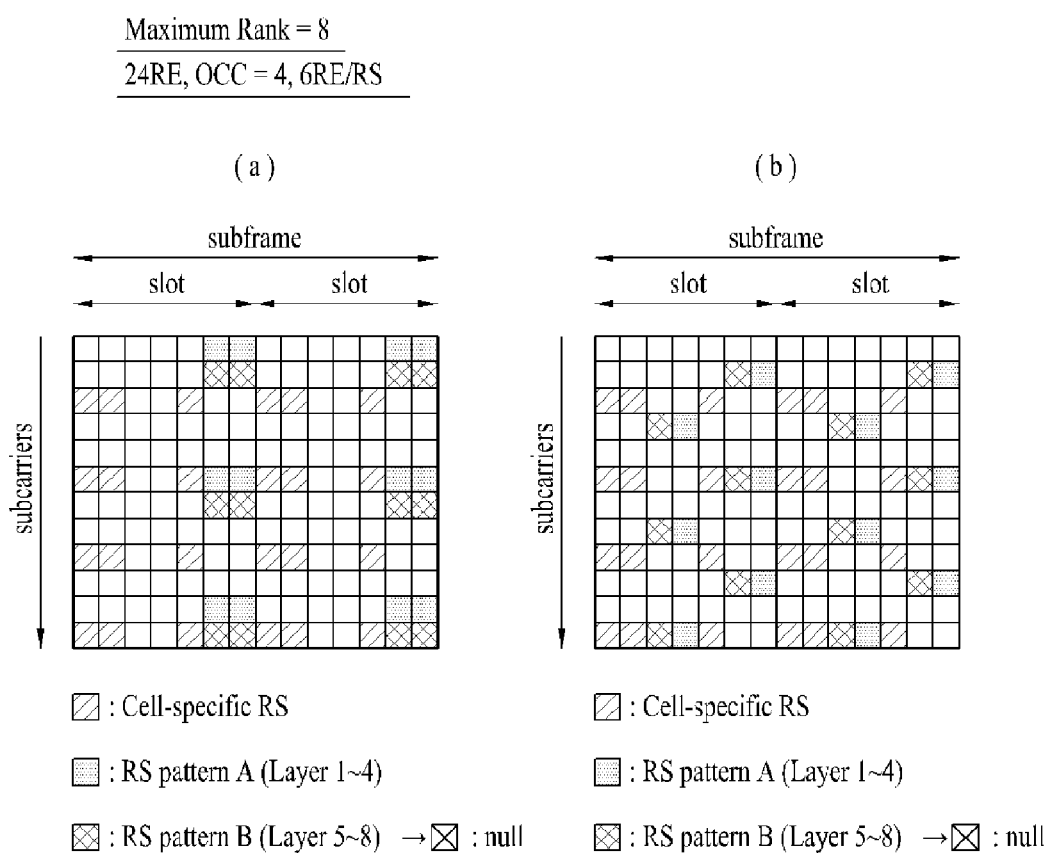
Figure 12:
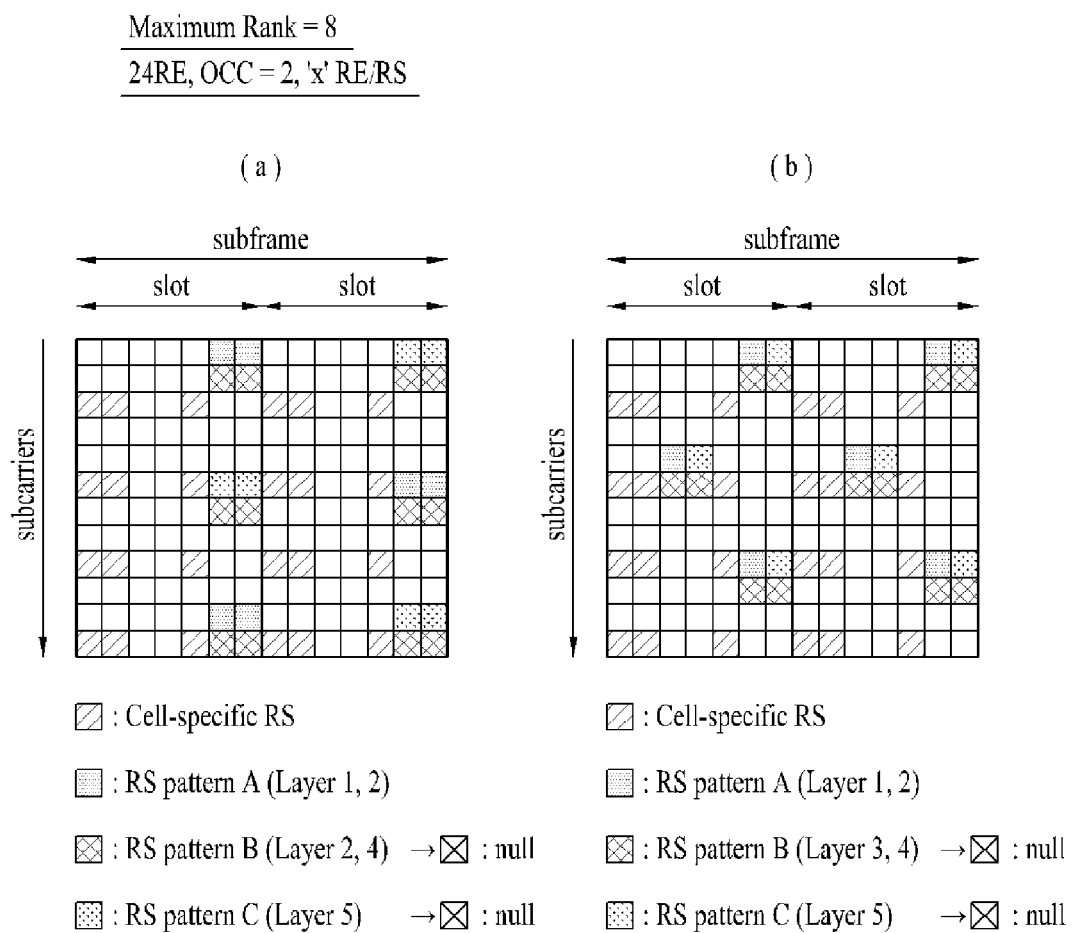
Figure 13:
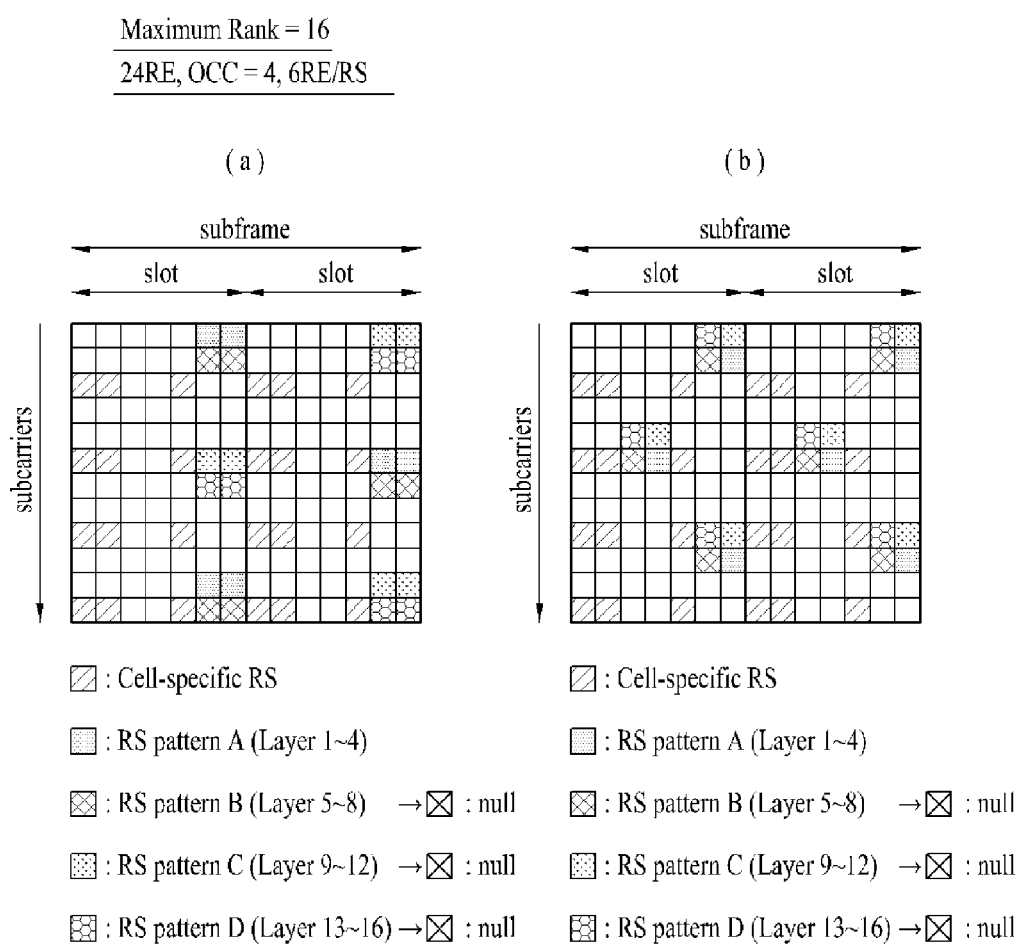

FIG. 7 to FIG. 13 respectively illustrate exemplary UE-specific RS patterns. FIG. 7 to FIG. 9 illustrate exemplary UE-specific RS patterns of a system supporting up to a maximum of rank-4, FIG. 10 to FIG. 12 illustrate exemplary UE-specific RS patterns of a system supporting up to a maximum of rank-8, and FIG. 13 illustrates an exemplary UE-specific RS patterns of a system supporting up to a maximum of rank-16. Other resource elements excluding the resource elements allocated to the cell-specific RS may be allocated to the UE-specific RS. In each of the corresponding drawings, (a) and (b) are merely examples of the UE-specific RS pattern. And, therefore, the UE-specific RS pattern may be defined to have a format different from the format shown in the corresponding drawings.

Depending upon a maximum number of resource elements that can be allocated to the entire UE-specific RS(s) and a number of resource elements occupied by a single RS pattern, a length of an orthogonal cover code that is used for spatial multiplexing and a method for extending a radio resource (e.g., FDM, TDM), and so on, within a single resource block pair, the position of an RS pattern having the layer of a specific user equipment multiplexed therein and a number of layers being multiplexed in a single RS pattern (or a number of user equipment, in case of the transmission of a single layer) may vary.

For reference, a reference signal is multiplexed over code channels, which are configured by a CS (Cyclic Shift) and an orthogonal cover of a basic sequence. And, herein, when extending an RS by using an Orthogonal Cover Code (OCC) having the length of 2, a maximum of 2 layers may be multiplexed in a single RS. Similarly, when extending an RS by using an OCC having the length of 4, a maximum of 4 layers may be multiplexed in a single RS. Herein, a ZC (Zadoff-Chu) sequence may be given as an example of the basic sequence, and a Walsh-Hadmard code may be given as an example of the orthogonal cover.

Referring to FIG. 7 and FIG. 8, in a system supporting a MIMO of up to a maximum of rank-4, it will be assumed that the number of resource elements being reserved for the entire UE-specific RS(s) within a pair of consecutive resource blocks (hereinafter referred to as a resource block pair) is fixed to 12 resource elements. For reference, hereinafter, when layers corresponding to the maximum rank are used, it will be defined that the number of resource elements being reserved for the entire UE-specific RS(s) indicates the number of resource elements within a resource block pair, which is required for transmitting the reference signals respective to all layers, for simplicity.

When an OCC having the length of 2 is used as the RS, up to two layers may be multiplexed in a single RS pattern. In other words, RSs being transmitted through a maximum of two layers may be multiplexed to a specific time-frequency domain by using a code division multiplexing (CDM) method. For example, in order to transmit reference information respective to a maximum of 4 layers, a total of 2 types of RS patterns are required. Therefore, 6 resource elements may be allocated within a resource block pair for each RS pattern. Meanwhile, a radio resource, which is extended by using the CDM method, may be extended once again by using the time division multiplexing (TDM) method or the frequency division multiplexing (FDM) method. Referring to FIG. 7(a), the reference information respective to layer 1 and layer 2 may be multiplexed in RS pattern A and then transmitted, and the reference information respective to layer 3 and layer 4 may be extended along the frequency direction so as to be multiplexed in RS pattern B and then transmitted. Referring to FIG. 7(b), the reference information respective to layer 1 and layer 2 may be multiplexed in RS pattern A and then transmitted, and the reference information respective to layer 3 and layer 4 may be extended along the time direction so as to be multiplexed in RS pattern B and then transmitted.

Meanwhile, when an OCC having the length of 4 is used, up to 4 layers may be multiplexed in a single RS pattern. Therefore, reference information respective to a maximum of 4 layers may be transmitted by using all of the 12 resource elements within a single resource block pair. And, eventually, 12 resource elements may be allocated for each RS pattern. Referring to FIG. 8, reference information respective to layers 1, 2, 3, and 4 may be multiplexed in RS pattern A so as to be transmitted through RS pattern A.

In FIG. 9, in a system supporting a MIMO of up to a maximum of rank-4, it will be assumed that the number of resource elements being reserved for the entire UE-specific RS(s) within a resource block pair is fixed to 12 resource elements.

In case the length of an OCC (Orthogonal Cover Code) that is used for the multiplexing of RSs is equal to 2, up to 2 layers may be multiplexed in a single RS. Accordingly, in order to transmit reference information respective to a maximum of 4 layers, a total of 2 types of RS patterns are required. Therefore, 6 resource elements may be allocated within a resource block pair for each RS pattern. Referring to FIG. 9, the reference information respective to layer 1 and layer 2 may be transmitted through RS pattern A, and the reference information respective to layer 3 and layer 4 may be transmitted through RS pattern B.

In FIG. 10 and FIG. 11, in a system supporting a MIMO of up to a maximum of rank-8, it will be assumed that the number of resource elements being reserved for the entire UE-specific RS(s) within a resource block pair is fixed to 24 resource elements.

In case the length of an OCC that is used for the multiplexing of RSs is equal to 2, up to two layers may be multiplexed in a single RS. Accordingly, in order to transmit reference information respective to a maximum of 8 layers, a total of 4 types of RS patterns are required. Therefore, 6 resource elements may be allocated within a resource block pair for each RS pattern. Referring to FIG. 10, the reference information respective to layer 1 and layer 2 may be transmitted through RS pattern A, the reference information respective to layer 3 and layer 4 may be transmitted through RS pattern B, the reference information respective to layer 5 and layer 6 may be transmitted through RS pattern C, and the reference information respective to layer 7 and layer 8 may be transmitted through RS pattern D. For reference, FIG. 10(a) illustrates an example wherein UE-specific RSs are being multiplexed by using the CDM method and the FDM method. FIG. 10(b) illustrates an example wherein UE-specific RSs are being multiplexed by using the CDM method, the FDM method, and the TDM method. FIG. 11(a) illustrates an example wherein UE-specific RSs are being multiplexed by using the CDM method and the FDM method. And, FIG. 11(b) illustrates an example wherein UE-specific RSs are being multiplexed by using the CDM method and the TDM method.

In case the length of an OCC that is used for the multiplexing of an RS is equal to 4, up to 4 layers may be multiplexed in a single RS. Accordingly, in order to transmit reference information respective to a maximum of 8 layers, a total of 2 types of RS patterns are required. Therefore, 12 resource elements may be allocated within a resource block pair for each RS pattern. Referring to FIG. 11, the reference information respective to layers 1 to 4 may be transmitted through RS pattern A, and the reference information respective to layers 5 to 8 may be transmitted through RS pattern B.

In FIG. 7 to FIG. 11, an example wherein the number of resource elements that is being allocated for each RS pattern within a resource block pair is described. However, the number of resource elements that is allocated for each RS pattern may also vary. For example, referring to FIG. 12, 6 resource elements may be allocated to each of RS pattern A and RS pattern C, and 12 resource elements may be allocated to RS pattern B.

In FIG. 13, in a system supporting a MIMO of up to a maximum of rank-16, it will be assumed that the number of resource elements being reserved for the entire UE-specific RS within a resource block pair is fixed to 24 resource elements.

In case the length of an OCC that is used for the multiplexing of RSs is equal to 4, up to 4 layers may be multiplexed in a single RS. Accordingly, in order to transmit reference information respective to a maximum of 16 layers, a total of 4 types of RS patterns are required. Therefore, when the RS is multiplexed by using the CDM and FDM and/or TDM methods, 6 resource elements may be allocated within a resource block pair for each RS pattern. Referring to FIG. 13, the reference information respective to layers 1 to 4 may be transmitted through RS pattern A, the reference information respective to layers 5 to 8 may be transmitted through RS pattern B, the reference information respective to layers 9 to 12 may be transmitted through RS pattern C, and the reference information respective to layers 13 to 16 may be transmitted through RS pattern D.

As shown in the examples of FIG. 7 to FIG. 13, depending upon the number of resource elements being reserved for the UE-specific RSs within a predetermined resource area, the OCC length, and the number of resource elements being allocated for each RS pattern, the position of the RS pattern having the layers of a specific user equipment being multiplexed therein may vary. Accordingly, when the specific user equipment demodulates the received data, the positions of the resource elements, which the user equipment is required to process as having a null value, may also vary. For example, it will be assumed that the base station can transmit data to user equipment 1 (UE1) and to user equipment 2 (UE2), which can receive up to a maximum of 4 layers. And, herein, it will also be assumed that data for UE1 can be transmitted in rank 2 by using layers 1 and 2, and that, data for UE2 can be transmitted in rank 2 by using layers 3 and 4. Referring to FIG. 7 to FIG. 9, although UE1 can demodulate data by using RS pattern A, among the resource elements for a UE-specific RS, UE1 should be capable of null-processing the resource elements allocated to RS pattern B and of demodulating the data. Additionally, although UE2 can demodulate data by using RS pattern B, among the resource elements for a UE-specific RS(s), UE2 should be capable of null-processing the resource elements allocated to RS pattern A and of demodulating the data. Referring to FIG. 8, UE1 and UE2 should be capable of demodulating data by using RS pattern A having 12 resource elements allocated thereto.

In another example, it will be assumed that the base station can transmit data to user equipment 1 (UE1) and to user equipment 2 (UE2), which can receive up to a maximum of 4 layers. And, herein, it will also be assumed that data for UE1 can be transmitted in rank 2 by using layers 1 and 2, that data for UE2 can be transmitted in rank 2 by using layers 3 and 4, and that data for user equipment 3 (UE3) can be transmitted in rank 1 by using layer 5. Referring to FIG. 10 to FIG. 12, UE1 should be capable of performing demodulation by using RS pattern A, while null-processing resource elements excluding the resource elements, which are allocated to the RS pattern A having layers 1 and 2 multiplexed therein, among the 24 resource elements that are designated for the UE-specific RS. UE2 should be capable of performing demodulation by using RS pattern B, while null-processing resource elements excluding the resource elements, which are allocated to the RS pattern B having layers 3 and 4 multiplexed therein, among the 24 resource elements that are designated for the UE-specific RS. And, UE3 should be capable of performing demodulation by using RS pattern C, while null-processing resource elements excluding the resource elements, which are allocated to the RS pattern C having layer 5 multiplexed therein, among the 24 resource elements that are designated for the UE-specific RS. Referring to FIG. 11, UE1 and UE2 should be capable of demodulating data by null-processing the resource elements allocated to RS pattern B, among the 24 resource elements that are designated for the UE-specific RS, and by using RS pattern A having layers 1 to 4 multiplexed therein. And, UE3 should be capable of demodulating data by null-processing the resource elements allocated to RS pattern A, among the 24 resource elements that are designated for the UE-specific RS, and by using RS pattern B.

1. RS Allocation Information

Therefore, the base station according to the exemplary embodiment of the present invention may transmit allocation information of RS(s), which is to be transmitted through a predetermined resource area, to user equipment within the base station coverage. The RS(s) of multiple layers may be transmitted through the predetermined resource area, and the specific RS pattern may be transmitted by using the entire resource elements or only a portion of the resource elements of the predetermined resource area. Referring to FIG. 8, RS pattern A is transmitted by using the entire predetermined resource area, which is configured of 12 resource elements. Referring to FIG. 9, RS pattern A is transmitted by using only half of the 12 resource elements. The other half of the 12 resource elements is used for transmitting RS pattern B.

The base station according to the exemplary embodiment of the present invention may transmit allocation information of the RS(s), which is allocated to the predetermined resource area, to the user equipment(s). The RS allocation information may indicate whether or not resource elements, which are allocated to an RS pattern other than the RS pattern having the layer of the specific user equipment multiplexed therein, exist in the predetermined resource area. Also, the RS allocation information may include information that may indicate the type of RS patterns being allocated to the predetermined resource area. Based upon the control of the processor (400b) of the base station, the resource mapper (305) of the base station maps an RS pattern designated to a specific user equipment to a predetermined resource area. The base station processor (400b) may multiplex multiple UE-specific RSs to the predetermined resource area by using the CDM and/or FDM, TDM methods. Meanwhile, the base station processor (400b) may generate information that can identify the allocation format of the predetermined resource area or the type of RS patterns (hereinafter referred to as RS pattern information), and may control the transmitter (100b) of the base station, so that the RS pattern information can be transmitted to the user equipment existing in the coverage of the base station or to a specific user equipment. Hereinafter, the RS pattern information (or also referred to as RS allocation information) that can be generated by the base station processor (400b) will now be described in detail.

Since the type of RS Pattern having a layer of a specific user equipment multiplexed therein may vary, depending upon the number of resource elements ($RE_{max}$) being reserved for the UE-specific RSs within a predetermined resource area, the length of an OCC (OCC), the number of resource elements being allocated for each RS pattern ($N_{RE}/RS_{Pattern}$), a maximum rank ($R_{max}$) that can be supported by the specific user equipment, and so on, the base station may provide the $RE_{max}$, OCC, $N_{RE}/RS_{Pattern}$, $R_{max}$, or only a portion of the same to the user equipment, so as to notify the user equipment of the type of the RS Pattern having layers multiplexed therein.

For reference, the $RE_{max}$, OCC, $N_{RE}/RS_{Pattern}$, and $R_{max}$ are merely exemplary. And, therefore, other information that can specify the type of the RS pattern instead of the above-mentioned information may also be used. Alternatively, among the $RE_{max}$, OCC, $N_{RE}/RS_{Pattern}$, $R_{max}$, in accordance with the system environment, in case information that is not required to be transmitted exists, the transmission of the corresponding information may be omitted. For example, when the $RE_{max}$ is fixed to a specific number, the base station may not transmit information related to $RE_{max}$. Also, in case the wireless communication system uses only an OCC having the length of 2 for the multiplexing process, information related to the OCC may not be transmitted. When the $N_{RE}/RS_{Pattern}$ is fixed, information on the $N_{RE}/RS_{Pattern}$ may not be transmitted, and when the $R_{max}$ is fixed, information on the $R_{max}$ may not be transmitted. The RS pattern type indicating information may hereinafter be described in detail with reference to exemplary implementation 1 to exemplary implementation 3.

Exemplary Implementation 1

Constant $R_{max}$, Variable OCC Constant $RE_{max}$

Herein, it will be assumed that the number of resource elements $RE_{max}$ being reserved for the UE-specific RS over a predetermined resource area is constant, that the maximum number of ranks $R_{max}$ that can be implemented is also constant, and that the number of resource elements being allocated for each RS pattern $N_{RE}/RS_{Pattern}$ varies for each RS pattern.

In case of the exemplary embodiment 1, the number of resource elements being allocated per RS Pattern varies in accordance with the OCC. Accordingly, the base station may provide information related to the OCC or the $N_{RE}/RS_{Pattern}$ to the user equipment as the RS pattern information. The user equipment may receive the information related to the OCC or the $N_{RE}/RS_{Pattern}$, so as to verify how many layers have been multiplexed in a single RS pattern and/or how many resource elements have been allocated to a single RS pattern. If at least one of the OCC and the $N_{RE}/RS_{Pattern}$ is designated, the type of the RS Pattern may be designated. And, therefore, the base station may transmit only the information one any one of the two factors.

For reference, the base station may express the RS pattern information by using indication information indicating any change occurring in the OCC or any change occurring in the RS pattern. For example, when an OCC having the length of 2 is essentially multiplexed and applied, and when the number of resource elements per RS pattern is equal to 12, the base station may transmit 0, so as to notify the user equipment that 2 layers per RS pattern have been multiplexed. And, the base station may transmit 1, so as to notify the user equipment that 4 layers per RS pattern have been multiplexed. Referring to FIG. 7 and FIG. 8, when the base station transmits 0, it may be recognized that 2 layers have been multiplexed for each RS pattern and that a UE-specific RS has been transmitted by the pattern shown in FIG. 7, wherein 6 resource elements are allocated for each RS pattern. And, when the base station transmits 1, it may be recognized that 4 layers have been multiplexed for each RS pattern and that a UE-specific RS has been transmitted by the pattern shown in FIG. 8, wherein 12 resource elements are allocated for each RS pattern.

Meanwhile, the base station may also transmit information indicating whether or not an RS pattern other than the RS pattern having the layers of the corresponding user equipment multiplexed therein exist as the RS pattern type information or the RS allocation information. The presence of another RS pattern may be indicated by information directing RS null-processing. For example, referring to FIG. 7 and FIG. 8, in case $R_{max}$ is equal to 4, and in case $RE_{max}$ is equal to 12, when the base station indicates the presence of another RS pattern, the user equipment may recognize that a portion of the resource elements, which are reserved for the predetermined resource area, i.e., the UE-specific RS, as shown in FIG. 7, has been allocated to the other RS pattern. For reference, when the user equipment is aware of (or informed of) the $R_{max}$ and the $RE_{max}$, the information indicating the presence of another RS pattern or the information directing null-processing may also be used as information indicating the number of layers being multiplexed per RS pattern and/or the number of resource elements being allocated per RS pattern.

Exemplary Implementation 2

Variable $R_{max}$, Constant OCC Constant $RE_{max}$

Herein, it will be assumed that the number of resource elements $RE_{max}$ being reserved for the UE-specific RS over a predetermined resource area is constant, that the length of the OCC being used for the multiplexing process is constant, that the number of resource elements being allocated for each RS pattern $N_{RE}/RS_{Pattern}$ does not vary for each RS pattern, and that the maximum number of ranks $R_{max}$ that can be implemented varies in accordance with the user equipment. For example, although the user equipment and the base station, which have been implemented in accordance with the LTE standard, can be implemented to up to rank 4, the user equipment and the base station, which have been implemented in accordance with the LTE-A standard, can be implemented to up to rank 8. Therefore, in a wireless communication environment wherein the LTE system co-exists with the LTE-A system, the $R_{max}$ may vary in accordance with the system device.

Referring to FIG. 9 and FIG. 10, when the $R_{max}$ varies, even though the OCC and the $RE_{max}$ remains unchanged, the RS pattern may vary. In a situation when OCCs having the same length are applied, when the $R_{max}$ is equal to 4, 12 resource elements may be allocated for each RS pattern. However, when the $R_{max}$ is equal to 8, 6 resource elements may be allocated for each RS pattern. Therefore, under a system having devices each realizing a different $R_{max}$, the base station may transmit information on the $R_{max}$ to the user equipment as RS pattern information or RS allocation information.

For reference, the base station may express the information related to the $R_{max}$ by using indication information indicating a change occurring in the $R_{max}$. For example, when the basic $R_{max}$ is equal to 4, the base station may transmit 0 so as to notify the user equipment that 12 resource elements have been allocated for each RS pattern. Additionally, the base station may also transmit 1 so as to notify the user equipment that 6 resource elements have been allocated for each RS pattern.

Meanwhile, when the length of the OCC that can be applied to the multiplexing process is not yet decided, information related to the OCC and/or the $N_{RE}/RS_{Pattern}$, which is mentioned in the exemplary implementation 1, may also be transmitted to the user equipment along with the information on the $R_{max}$.

As shown in the exemplary implementation 1, for the RS pattern type information or the RS allocation information, information indicating whether or not an RS pattern other than the RS pattern having the layers of the corresponding user equipment multiplexed therein exist may be transmitted as the RS pattern type information or the RS allocation information. The presence of another RS pattern may also be indicated by information directing RS null-processing.

Exemplary Implementation 3

Constant $R_{max}$, Constant OCC Variable $RE_{max}$

Herein, it will be assumed that the length of the OCC being used for the multiplexing process is constant, that the maximum number of ranks $R_{max}$ that can be implemented is constant, that the number of resource elements being allocated for each RS pattern $N_{RE}/RS_{Pattern}$ does not vary for each RS pattern, and that the number of resource elements $RE_{max}$ being reserved for the UE-specific RS over a predetermined resource area varies.

Referring to FIG. 7 and FIG. 9, when the $RE_{max}$ varies, even though the OCC and the $R_{max}$ remains unchanged, the RS pattern may vary. In a situation when the $R_{max}$ is equal to 4, and when the OCC is equal to 2, when the $RE_{max}$ is equal to 12, 6 resource elements may be allocated for each RS pattern. However, when the $RE_{max}$ is equal to 24, 12 resource elements may be allocated for each RS pattern. Therefore, when the $RE_{max}$ is differently set up in a predetermined resource area, the base station may transmit information on the $RE_{max}$ to the user equipment as RS pattern information or RS allocation information.

For example, when the $RE_{max}$ respectively varies from 12, 18, and 24, the base station may use 2 bits to specify the number of resource elements reserved for the UE-specific RS. For example, when 12 resource elements are reserved 00 may be transmitted to the user equipment as the information on the $RE_{max}$, when 18 resource elements are reserved 01 may be transmitted to the user equipment as the information on the $RE_{max}$, and when 24 resource elements are reserved 10 may be transmitted to the user equipment as the information on the $RE_{max}$.

For reference, the base station may express the information related to the $RE_{max}$ by using indication information indicating a change occurring in the $RE_{max}$. For example, when the basic $RE_{max}$ is equal to 12, and, in addition to the case when the basic $RE_{max}$ is equal to 12, when 24 resource elements may be used, the base station may transmit 0 so as to notify the user equipment that all of the 12 resource elements have been allocated for the UE-specific RS. Additionally, the base station may also transmit 1 so as to notify the user equipment that all of the 24 resource elements have been allocated for the UE-specific RS.

Meanwhile, when the length of the OCC that can be applied to the multiplexing process is not yet decided, information related to the OCC and/or the $N_{RE}/RS_{Pattern}$, which is mentioned in the exemplary implementation 1, may also be transmitted to the user equipment along with the information on the $RE_{max}$.

Also, in case the $RE_{max}$ may vary, information on the $RE_{max}$, which has been described earlier in the exemplary implementation 2, may be further transmitted to the user equipment.

As shown in the exemplary implementations 1 and 2, for the RS pattern type information or the RS allocation information, information indicating whether or not an RS pattern other than the RS pattern having the layers of the corresponding user equipment multiplexed therein exist may be transmitted as the RS pattern type information or the RS allocation information. The presence of another RS pattern may also be indicated by information directing RS null-processing.

The base station processor (400b) according to the exemplary embodiment of the present invention may be configured to generate RS allocation information for the user equipment existing within the base station coverage. The base station processor (400b) may configure the RS allocation information in a DCI format, and the base station processor (400b) may control the transmitter (100b) of the base station so that the RS allocation information can be transmitted through the PDCCH. Examples of the DCI format, wherein the RS allocation information can be included, and the corresponding transmission channel will be described in more detail later on with reference to FIG. 14 and FIG. 15.

The processor (400a) of the user equipment according to the exemplary embodiment of the present invention may verify which type or format of the UE-specific RS based upon the RS allocation information, which has been transmitted from the base station. For example, the receiver (300b) of the user equipment receives the RS allocation information transmitted from the base station and, then, transmits the received RS allocation information to the processor (400a) of the user equipment. The user equipment processor (400a) may verify whether or not an RS pattern other than the RS Pattern having the layers of the user equipment multiplexed therein exists. Furthermore, the user equipment processor (400a) may decide the $R_{max}$ and/or $RE_{max}$, the number of layer being multiplexed per RS pattern, and the number of resource elements being allocated per RS pattern in the predetermined resource area by using the RS allocation information. Therefore, the user equipment processor (400a) may verify in what type of RS pattern format the UE-specific RS has been transmitted based upon the RS allocation information.

2. Layer Information

Meanwhile, even though the type of the RS pattern is known, in order to allow the user equipment to demodulate data, the transmission layer of the corresponding user equipment should be known. Accordingly, apart from the RS allocation information, the base station according to the present invention may transmit layer information specifying which layer, among the multiple layers supporting the multiple-user MIMO, should be used in order to demodulate data, i.e., layer information specifying the layer(s) being used by the corresponding user equipment to the user equipment.

Number of Layers+Layer Indication Information of the User Equipment

In order to indicate which layer should be used, among the multiple layers supporting the multiple-user MIMO, for demodulating data, the exemplary embodiment of the present invention may transmit information indicating the number of transmission layers of a specific user equipment and information indicating the transmission layer to the user equipment. The layer indication information may correspond to information indicating a starting layer, among the multiple layers that are used for the transmission performed by the specific user equipment.

Additionally, by indexing arrays that are configured on specific layers, and by having the array-specific index shared between the base station and the user equipment, layers of the specific user equipment may be indicated. For example, when the base station transmit a specific index to the user equipment, the user equipment may recognize the layer(s) configuring the array, which correspond(s) to the transmitted index, as the transmission layer(s).

After receiving the RS allocation information and the layer information, the user equipment may use the received information so as to be aware of which RS pattern and which layer should be used in order to demodulate the data.

For example, when the transmission layer of UE1 corresponds to layer 1 and layer 2, the base station may transmit information indicating that 2 layers are being used and information indicating that layer 1 corresponds to the starting layer to UE1. Referring to FIG. 10, when the $RE_{max}$ is equal to 24, when the OCC is equal to 2, and when an RS pattern having 6 resource elements per RS pattern allocated thereto is being used, UE1 may be aware that such RS pattern has been transmitted, based upon the above-described RS pattern information. Based upon the layer information, among the RS patterns shown in FIG. 10, UE1 may use RS pattern A so as to demodulate data, and may null-process the resource elements of the remaining RS patterns B, C, and D. In another example, referring to FIG. 11, when the $RE_{max}$ is equal to 24, when the OCC is equal to 4, and when an RS pattern having 12 resource elements per RS pattern allocated thereto is being used, UE1 may be aware that such RS pattern has been transmitted, based upon the above-described RS pattern information. Based upon the information on the number of layers and the layer indication information, among the RS patterns shown in FIG. 11, UE1 may null-process the resource elements of RS pattern B, and UE1 may use RS pattern A so as to demodulate data. Herein, however, among layer 1 to layer 4 being multiplexed in RS pattern A, UE1 may use layer 1 and layer 2 to demodulate the data.

For reference, in case the number of layers that can be used for each user equipment is fixed, the information indicating the number of layers may be omitted.

Meanwhile, the base station may further notify the user equipment of the total number of layers currently supporting the multiple-user MIMO, i.e., the total rank.

By notifying the user equipment of the total rank, the presence or absence of another user equipment may be notified to the corresponding user equipment. In a system having the maximum rank $R_{max}$ be equal to 8, the total rank participating in the multiple-user MIMO may be expressed as 3 bits.

Therefore, the base station processor (400b) according to the exemplary embodiment of the present invention may generate layer information in accordance with the above-described examples, and the base station processor (400b) may control the transmitter (100b) of the base station so as to transmit the layer information to the user equipment existing in the corresponding coverage. The resource mapper (305) of the base station allocates the layer information to a predetermined control region, based upon the control of the base station. The transmitter (100b) transmits the layer information to the user equipment(s) from the predetermined control region, based upon the control of the base station.

The receiver (300a) of the user equipment receives the layer information and delivers the received layer information to corresponding processor (400a). Based upon the received layer information, the processor (400a) of the receiver may decide according to which of the RS patterns, among the RS patterns that can be transmitted, the data should be demodulated. Also, when multiple layers are multiplexed to the RS pattern, the processor (400a) may also decide which layer, among the multiplexed layers, should be used for demodulating the data. More specifically, based upon the RS pattern information, the user equipment receiver (300a) may decide the $R_{max}$ and/or $RE_{max}$, the number of layer being multiplexed per RS pattern, and the number of resource elements being allocated per RS pattern in the predetermined resource area by using the RS allocation information. And, based upon the layer information, the user equipment receiver (300a) may also decide which RS pattern, among the predetermined types of RS patterns, should be used. For example, referring to FIG. 11, based upon the RS allocation information, the processor (400a) of UE1 may verify that an RS pattern other than the RS pattern having the transmission layers of UE1 multiplexed thereto exists. Additionally, based upon the RS allocation information, UE1 may also verify that an RS pattern having the $RE_{max}$ value equal to 24, the OCC value equal to 4, and 12 resource elements being allocated for each RS pattern has been transmitted. Furthermore, based upon the information on the number of layers and the layer indication information, the processor (400a) of the UE1 may verify that, among RS pattern A and RS pattern B of FIG. 11, the layer of UE1 has been multiplexed to RS pattern A. Accordingly, UE1 may be configured to null-process the resource elements of RS pattern B and to use RS pattern A so as to demodulate data.

Herein, however, among layer 1 to layer 4 that are multiplexed in RS pattern A, UE1 may use layer 1 and layer 2 to demodulate the data.

If the user equipment is unaware (or not informed) of the rank and layer currently used by the corresponding user equipment and of the presence or absence of another user equipment, which uses a different RS pattern, and which is scheduled with the corresponding user equipment, a difference in the channel estimation may increase due to such ambiguity. Therefore, the exemplary embodiment of the present invention is advantageous in that the RS pattern and layer that are to be used for demodulation may be accurately specified, thereby preventing any degradation in the demodulating performance from occurring.

Meanwhile, the above-described RS pattern information and layer information, which are used for enhancing the demodulating performance, may be transmitted to the user equipment through a higher layer signaling higher than the physical layer. The base station processor (400*b*) according to the embodiment of the present invention may control the corresponding transmitter (100*b*) so that the higher layer signaling can be performed either periodically or at a time point generated by the user equipment, when a Coordinated Multi-Point (CoMP) should be performed.

The RS pattern information and the layer information may also be transmitted to the user equipment through the PDCCH via L1/L2 control signaling. The base station transmits Downlink Control Information (DCI) through the PDCCH. The base station selects a DCI format, so as to include downlink control information in accordance with the selected DCI format. The base station processor (400*b*) selects a DCI format, and the base station processor (400*b*) may configure the above-described RS pattern information and/or layer information as the downlink control information of the selected DCI format. The transmitter (100*b*) of the base station processes the downlink control information with demodulation, layer mapping, resource allocation, and so on, based upon the control of the base station processor (400*b*), so as to transmit the processed downlink control information to the user equipment(s) existing in the coverage of the corresponding base station.

The DCI includes uplink scheduling information, downlink scheduling information, system information, uplink power control command, control information for paging, control information for directing random access response (RACH response), and so on. Additionally, the DCI may also include control information for directing the activation of Semi-Persistent Scheduling (SPS). The DCI may also include control information for directing the non-activation of Semi-Persistent Scheduling (SPS). Herein, the Semi-Persistent Scheduling (SPS) may be used for performing uplink or downlink VoIP (Voice over Internet Protocol) transmission.

Examples of the DCI format includes Format 0 for PUSCH (Physical Uplink Shared Channel) scheduling, Format 1 for scheduling a PDSCH (Physical Downlink Shared channel) codeword, Format 1A for performing a compact scheduling of a PDSCH codeword, Format 1B for performing scheduling on a Rank-1 transmission of a single codeword in a spatial multiplexing mode, Format 1C for performing a very compact scheduling of a DL-SCH (Downlink Shared Channel), Format 1D for performing PDSCH scheduling in a multiple-user spatial multiplexing mode, Format 2 for performing PDSCH scheduling in a Closed-loop spatial multiplexing mode, Format 2A for performing PDSCH scheduling in an Open-loop spatial multiplexing mode, Format 2B for performing PDSCH scheduling in a multi-layer beamforming process, and Formats 3 and 3A for transmitting a TPC (Transmission Power Control) command for an uplink channel.

Table 1 and Table 2, Table 3 respectively show exemplary downlink control information being transmitted by using DCI Format 1B and DCI Format 1D, DCI Format 2B.

TABLE 1

| Information Field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 1 |

TABLE 2

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| Downlink Power offset | 1 |

TABLE 3

| Information field | bit(s) |
| --- | --- |
| Resource allocation header | 1 |
| Resource block assignment | $\lceil N_{RB}^{DL}/P \rceil$ for type 0, $(\lceil N_{RB}^{DL}/P \rceil - \lceil \log_2(P) \rceil - 1)$ for type 1 |
| TPC command for PUCCH | 2 |
| Downlink Assignment Index | 2 |
| HARQ process number | 3(FDD), 4(TDD) |
| Transport block to codeword swap flag | 1 |
| Modulation and coding schmeme | 5 |
| New data indicator | 2 |
| Redundancy version | 2 |
| Precoding information | 3 or 6 |

The number of bits specified in each information field of Table 1, Table 2, and Table 3 shown above are merely exemplary. The DCI formats of Table 1, Table 2, and Table 3 may be transmitted in a single-user MIMO. However, the multiple-user MIMO may also configure DCI formats having the same size as the DCI of the single-user MIMO, so as to be capable of transmitting the above-described RS pattern information and/or layer information.

For example, when demodulation is realized (or performed) for a multiple-user MIMO operation, based upon the UE-specific RS, information bits respective to the TPMI and the PMI may be deleted. Accordingly, the RS pattern information and/or layer information according to the exemplary embodiment of the present invention may be transmitted in a space reserved by the above-described process. When the DCI formats of Table 1, Table 2, and Table 3 are modified, exemplary modifications of the DCI formats of Table 1, Table 2, and Table 3, which are modified for the RS pattern information and/or layer information, will hereinafter be shown below in Table 4, Table 5, and Table 6.

TABLE 4

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| RS allocation and/or layer information | 5 |

TABLE 5

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| RS allocation and/or layer information | 4 |
| Downlink Power offset | 1 |

TABLE 6

| Information field | bit(s) |
| --- | --- |
| Resource allocation header | 1 |
| Resource block assignment | $\lceil N_{RB}^{DL}/P \rceil$ for type 0, ($\lceil N_{RB}^{DL}/P \rceil - \lceil \log_2(P) \rceil - 1$) for type 1 |
| TPC command for PUCCH | 2 |
| Downlink Assignment Index | 2 |
| HARQ process number | 3(FDD), 4(TDD) |
| Transport block to codeword swap flag | 1 |
| Modulation and coding schmeme | 5 |
| New data indicator | 2 |
| Redundancy version | 2 |
| RS allocation and/or layer information | 3 or 6 |

The configurations shown in Table 4, Table 5, and Table 6 are merely exemplary. And, therefore, the RS allocation information and layer information may be transmitted by modifying other fields included in the DCI Format 1B and/or 1D, 2B, or other DCI formats may be used. Alternatively, a new DCI format may be newly configured for the multiple-user MIMO.

Figure 14:
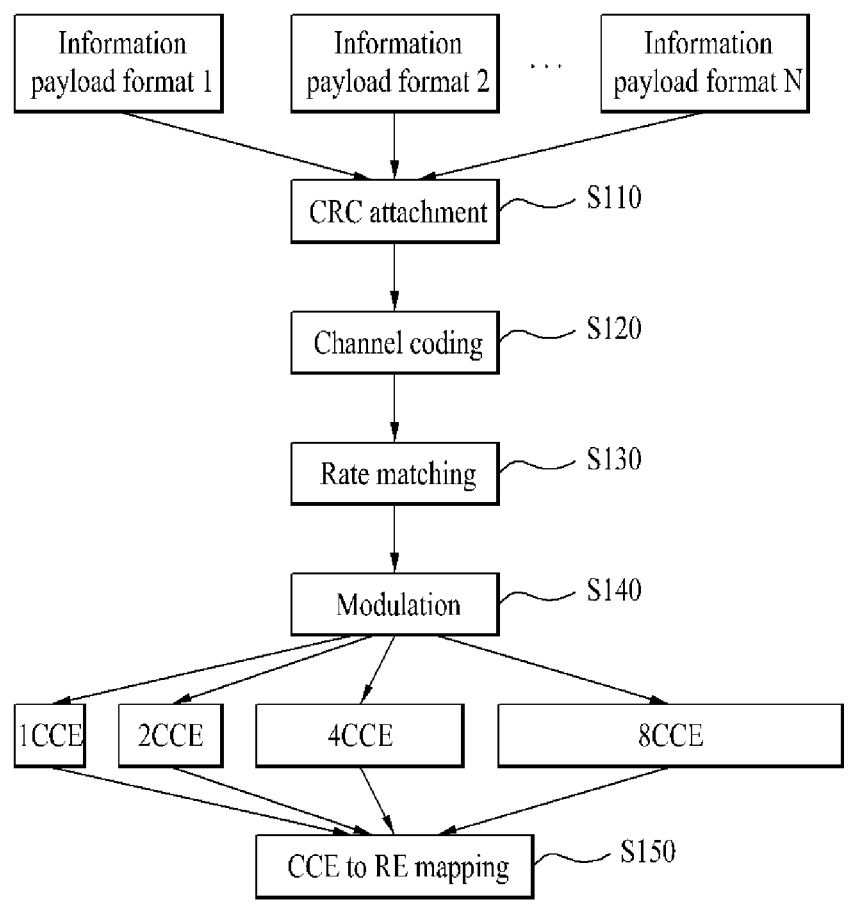
FIG. 14 illustrates a flow chart showing a PDCCH configuration.

FIG. 14 illustrates a flow chart showing a PDCCH configuration.

Referring to FIG. 14, the base station generates control information in accordance with the DCI format. The base station may generate control information in accordance with the RS allocation information and/or layer information, which are to be transmitted to the user equipment, and the base station may select a DCI format among multiple DCI formats (DCI format 1, 2, . . . , N). Herein, a CRC (Cyclic Redundancy Check) for error detection is added to the control information, which is generated in accordance with each DCI format (S110). Then, depending upon the owner or purpose of the PDCCH, an identifier (in this case, referred to as an RNTI (Radio Network Temporary Identifier)) is masked to the CRC. In case of a PDCCH for a specific user equipment, a unique identifier of the user equipment, e.g., C-RNTI (Cell-RNTI) may be masked to the CRC. More specifically, the CRC may be scrambled along with the unique identifier of the user equipment.

The base station performs channel-coding on the control information having the CRC added thereto and generates coded data (S120). And, then, the base station performs rate matching respective to a CCE group level, which is allocated to the PDDCH, on the coded data (S130). The base station modulates the coded data so as to generate modulation symbols (S140). Thereafter, the base station performs CCE to RE mapping on the modulation symbols to physical resource elements (RE) (S150).

The base station processor (400b) is configured to generate control information in accordance with the DCI format. The base station processor (400b) may generate control information in accordance with the RS allocation information and/or layer information, which are to be transmitted to the user equipment, and the base station may select a DCI format among multiple DCI formats (DCI format 1, 2, . . . , N). Herein, the base station processor (400b) may add a CRC (Cyclic Redundancy Check) for error detection to the control information, which is generated in accordance with each DCI format. Then, depending upon the owner or purpose of the PDCCH, the base station processor (400b) may mask an identifier (in this case, referred to as an RNTI (Radio Network Temporary Identifier)) to the CRC. Since the RS allocation information and/or layer information of the present invention may vary depending upon the user equipment, the base station processor (400b) according to the present invention may mask a unique identifier of the specific user equipment, e.g., C-RNTI (Cell-RNTI) to the CRC in the PDCCH, which carries the RS allocation information and/or layer information for the specific user equipment. More specifically, the base station processor (400b) may control the scrambler (301) of the base station, so that the CRC can be scrambled along with the unique identifier of the user equipment.

The base station processor (400b) performs channel-coding on the control information having the CRC added thereto and generates coded data. And, then, the base station processor (400b) performs rate matching respective to a CCE group level, which is allocated to the PDDCH, on the coded data. Based upon the control of the base station processor (400b), the modulation mapper (303) of the base station may modulate the coded data so as to generate modulation symbols. Thereafter, based upon the control of the base station processor (400b), the resource element mapper (305) of the base station may perform CCE to RE mapping on the modulation symbols to physical resource elements (RE). Based upon the control of the base station processor (400b), the transmitter (100b) and antenna (500b) of the base station may transmit the symbols to the corresponding user equipment(s) through the resource element.

The base station processor (400b) may control the resource element mapper (305) so that multiple PDCCHs, which are multiplexed with respect to multiple user equipment, can be mapped to a control region of a single subframe. Based upon the control of the base station processor (400b), the transmitter (100b) and the antenna (500b) may transmit the subframe to the multiple user equipment.

Figure 15:
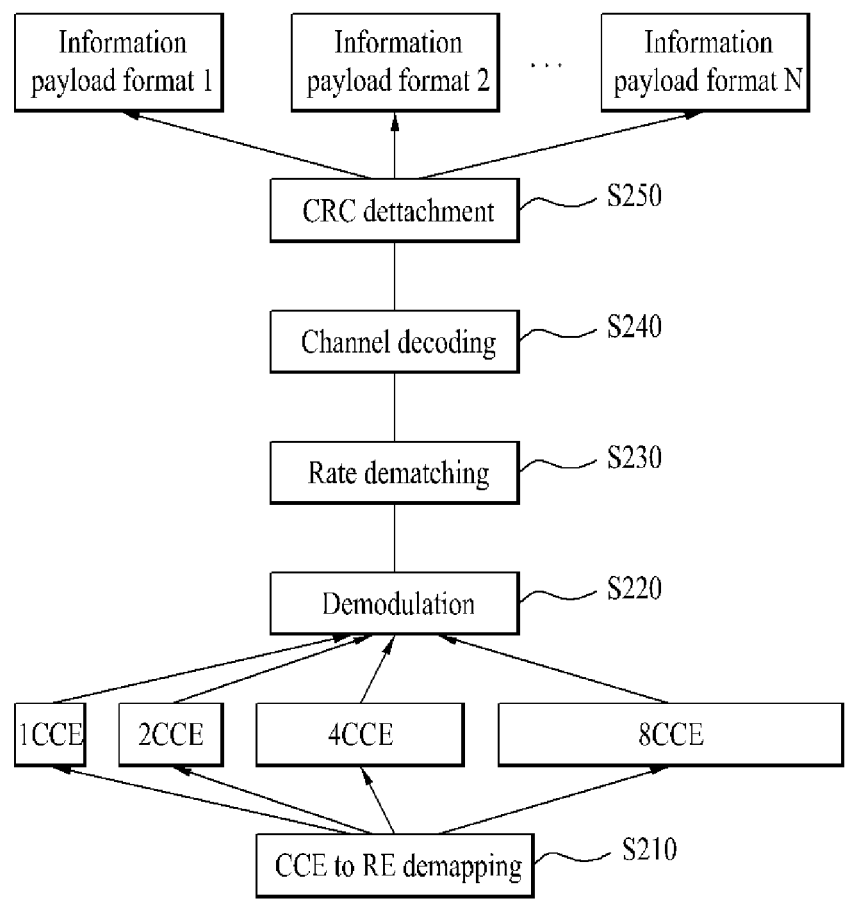
FIG. 15 illustrates a flow chart showing a PDCCH processing procedure.

FIG. 15 illustrates a flow chart showing a PDCCH processing procedure.

Referring to FIG. 15, the user equipment performs CCE to RE demapping on the physical resource elements, which are transmitted from the base station (S210). Since the user equipment is unaware of the CCE group level by which the corresponding user equipment is to receive the PDDCH, the user equipment performs demodulation with respect to each of the CCE group levels (S220). The user equipment performs rate dematching on the demodulated data (S230). When receiving the control information, since the user equipment is unaware of the DCI format to which the control information corresponds, the user equipment performs channel decoding on the transmission rate dematched data in accordance with the code rate. Thereafter, the user equipment performs CRC checking, so as to perform error detection. If no error has occurred, the user equipment determines that the user equipment has detected its own PDDCH. However, when an error has occurred, the user equipment continuously performs blind decoding on other CCE group levels or other DCI formats (S240). When the user equipment has detected its own PDCCH, the user equipment eliminates (or removes) the CRC from the decoded data and, then, acquires control information, e.g., RS pattern information and/or layer information according to the exemplary embodiment of the present invention, which are required by the user equipment (S250).

The multiplexed multiple PDCCHs respective to multiple user equipment may be transmitted on the control region of one subframe. The user equipment monitors the PDCCHs. Herein, the monitoring process refers to a process of attempting to decode each of the PDCCHs in accordance with a DCI format, according to which the user equipment is being monitored. In the control region allocated within the subframe, the base station may not provide information on the position where the PDCCH corresponding to the user equipment is located. In this case, the user equipment monitors a group of PDCCH candidates within the subframe. This process is referred to as blind decoding (or blind detection). By performing blind decoding, the user equipment simultaneously performs identification of a PDCCH, which is transmitted to the corresponding user equipment, and decoding of the control information, which is transmitted through the corresponding PDCCH. For example, in case the corresponding PDCCH performs demasking on its own C-RNTI and determines that a CRC error is not detected, the user equipment determines that the corresponding user equipment has detected its own PDCCH.

After detecting its own PDDCH, the corresponding user equipment may identify the corresponding RS pattern and the corresponding transmission layer based upon the RS pattern information and/or layer information, which are transmitted through the PDCCH. The user equipment may use the corresponding RS pattern and/or transmission layer so as to demodulate the data, which are transmitted through the PDSCH.

For reference, in order to effectively decrease an overhead the blind decoding process, the number of DCI format that are transmitted through the PDCCH may be limitedly defined. Accordingly, the number of DCI formats may be smaller than the number of heterogeneous control information types, which are being transmitted by using the PDCCH. The DCI format includes a plurality of information fields, each being different from one another. The type of information fields, the number of information fields, and the number of bits for each information field may vary depending upon the DCI format. Additionally, the size of the control information being matched to the DCI format may also vary depending upon the DCI format. Various control information may configure the PDCCH transmission by using only one of the DCI formats, among the limited number of DCI formats. More specifically, a random DCI format may be used for transmitting two or more different types of control information. Accordingly, when control information becomes specified by having a specific value assigned to the information field of the corresponding DCI format, among the plurality of information fields, some of the information fields may not be required (or necessary). More specifically, among the plurality of information fields configuring a DCI format, a detailed value may not be defined for some of the information fields. Some of the information fields configuring the corresponding DCI format may be defined as a reserved field, so as to be reserved to be in a state having an arbitrary value assigned thereto. This is to perform size adaptation on the plurality of heterogeneous control information types to a single DCI format.

The user equipment processor ($400a$) controls the receiver ($300a$) so that CCE to RE demapping can be performed on the physical resource elements, which are transmitted from the base station. Since the user equipment processor ($400a$) is unaware of the CCE group level by which the corresponding user equipment is to receive the PDDCH, the user equipment processor ($400a$) controls the receiver ($300a$) so that demodulation can be performed with respect to each of the CCE group levels. Additionally, based upon the control of the user equipment processor ($400a$), the receiver ($300a$) of the user equipment performs rate dematching on the demodulated data. When receiving the control information, since the processor ($400a$) of the user equipment is unaware of the DCI format to which the control information corresponds, the processor ($400a$) of the user equipment controls the receiver ($300a$) so that channel decoding can be performed on the transmission rate dematched data in accordance with the code rate. Thereafter, the processor ($400a$) of the user equipment controls the receiver ($300a$) so that CRC checking can be performed, so as to detect the occurrence of any error. If no error has occurred, the processor ($400a$) of the user equipment controls the receiver ($300a$) of the user equipment, so as to determine that the user equipment has detected its own PDDCH. However, when an error has occurred, the processor ($400a$) of the user equipment controls the receiver ($300a$) of the user equipment so that blind decoding can be continuously performed on other CCE group levels or other DCI formats. When the processor ($400a$) of the user equipment has detected its own PDCCH, the processor ($400a$) of the user equipment eliminates (or removes) the CRC from the decoded data and, then, acquires control information, e.g., RS pattern information and/or layer information according to the exemplary embodiment of the present invention, which are required by the user equipment.

Meanwhile the processor ($400a$) of the user equipment may control the receiver ($300a$) so that the receiver ($300a$) can attempt to decode each of the PDCCHs in accordance with a DCI format, according to which the user equipment is being monitored. As described above, in the control region allocated within the subframe, the base station may not provide information on the position where the PDCCH corresponding to the user equipment is located. In this case, the user equipment processor ($400a$) monitors a group of PDCCH candidates within the subframe.

Based upon the control of the user equipment processor ($400a$), the receiver ($300a$) may simultaneously perform identification of a PDCCH, which is transmitted to the user equipment, and decoding of the RS allocation information and/or layer information, which are transmitted through the corresponding PDCCH. In case the user equipment processor ($400a$) performs demasking on the C-RNTI of the user equipment and determines that a CRC error is not detected, the user equipment processor ($400a$) may determine that the corresponding user equipment has detected the PDCCH of the user equipment. The user equipment processor ($400a$) identifies whether or not at least one or more RS patterns have been transmitted based upon the RS allocation information and/or layer information, which are carried by the PDCCH from which an error has not been detected, and/or identifies the types of RS patterns. Additionally, the user equipment processor (400a) may also determine to which RS pattern the layer of the corresponding user equipment has been multiplexed. Furthermore, in case a plurality of UE-specific RS patterns have been transmitted, among the resource elements that are being reserved for the UE-specific RS, the user equipment processor (400a) may control the receiver (300a) so that resource elements, which are not allocated to the RS pattern having layers of the user equipment multiplexed thereto, can be null-processed and that data can be demodulated. Based upon the control of the user equipment processor (400a), the receiver (300a) may demodulate the PDSCH by using the corresponding RS Pattern and transmission layer.

In order to perform size adaptation on the multiple types of heterogeneous control information, when configuring the DCI, the base station processor (400b) according to the exemplary embodiment of the present invention may allocate the RS allocation information and/or layer information from the corresponding format and may determine and assign an arbitrary value (e.g., null value) to the remaining bits.

As described above, the detailed description of the present invention are provided herein so that anyone skilled in the art can implement and realize the embodiments of the present invention. Although the preferred embodiments of the present invention have been disclosed and described herein, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon the understanding and interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be used in a mobile station, base station, or other equipment of a wireless mobile communication system.

What is claimed is:

1. A method for transmitting, by a base station, a user specific reference signal to a user equipment in a wireless communication system, the method comprising:
   transmitting, by the base station, a control signal including reference signal pattern information for the user equipment and layer information for the user equipment; and
   transmitting, by the base station, the user equipment specific reference signal and one or more transmission layers to the user equipment on a predetermined resource area based on the control signal,
   wherein the reference signal pattern information includes
      information indicating a maximum number of resource elements reserved for transmission of user equipment specific reference signals on the predetermined resource area,
      information indicating a length of orthogonal cover codes used in multiplexing the user equipment specific reference signals,
      information indicating a number of resource elements occupied per reference signal pattern, and
      information indicating whether or not there is a second reference signal pattern, which is different from a first reference signal pattern used for the user equipment, and which is used for another user equipment, on the predetermined resource area, and
   wherein the layer information includes
      information indicating a total number of transmission layers transmitted on the predetermined resource area, and
      information specifying the one or more transmission layers for the user equipment among the transmission layers transmitted on the predetermined resource area.

2. The method of claim 1, wherein the layer information includes information indicating a number of the one or more transmission layers for the user equipment and information indicating a starting transmission layer among the one or more transmission layers for the user equipment.

3. A base station of transmitting a user equipment reference signal to a user equipment in a wireless communication system, the base station comprising:
   a transmitter; and
   a processor configured to control the transmitter to transmit a control signal including reference signal pattern information for the user equipment and layer information for the user equipment; and to control the transmitter to transmit the user equipment specific reference signal and one or more transmission layers to the user equipment on a predetermined resource area based on the control signal,
   wherein the reference signal pattern information includes
      information indicating a maximum number of resource elements reserved for transmission of user equipment specific reference signals on the predetermined resource area,
      information indicating a length of orthogonal cover codes used in multiplexing the user equipment specific reference signals,
      information indicating a number of resource elements occupied per reference signal pattern, and
      information indicating whether or not there is a second reference signal pattern, which is different from a first reference signal pattern used for the user equipment, and which is used for another user equipment, on the predetermined resource area, and
   wherein the layer information includes
      information indicating a total number of transmission layers transmitted on the predetermined resource area, and
      information specifying the one or more transmission layers for the user equipment among the transmission layers transmitted on the predetermined resource area.

4. The base station of claim 3, wherein the layer information includes information indicating a number of the one or more transmission layers for the user equipment and information indicating a starting transmission layer among the one or more transmission layers for the user equipment.

5. A method for receiving, by a user equipment, a user equipment specific reference signal, the method comprising:
receiving, by the user equipment, a control signal including reference signal pattern information for the user equipment and layer information for the user equipment; and
receiving, by the user equipment, the user equipment specific reference signal and one or more transmission layers on a predetermined resource area based on the control signal,
wherein the reference signal pattern information includes
information indicating a maximum number of resource elements reserved for transmission of user equipment specific reference signals on the predetermined resource area,
information indicating a length of orthogonal cover codes used in multiplexing the user equipment specific reference signals,
information indicating a number of resource elements occupied per reference signal pattern, and
information indicating whether or not there is a second reference signal pattern, which is different from a first reference signal pattern used for the user equipment, and which used for another user equipment, on the predetermined resource area, and
wherein the layer information includes
information indicating a total number of transmission layers transmitted on the predetermined resource area, and
information specifying the one or more transmission layers for the user equipment among the transmission layers transmitted on the predetermined resource area.

6. The method of claim 5, further comprising:
null-processing the second reference signal pattern.

7. The method of claim 5, wherein the layer information includes information indicating a number of the one or more transmission layers for the user equipment and information indicating a starting transmission layer among the one or more transmission layers for the user equipment.

8. A user equipment for receiving a user equipment specific reference signal in a wireless communication system, the user equipment comprising:
a receiver; and
a processor configured to control the receiver to
receive a control signal reference signal pattern information for the user equipment and layer information for the user equipment; and
receive the user equipment specific reference signal and one or more transmission layers on a predetermined resource area,
wherein the reference signal pattern information includes
information indicating a maximum number of resource elements reserved for transmission of user equipment specific reference signals on the predetermined resource area,
information indicating a length of orthogonal cover codes used in multiplexing the user equipment specific reference signals,
information indicating a number of resource elements occupied per reference signal pattern, and
information indicating whether or not there is a second reference signal pattern, which is different from a first reference signal pattern used for the user equipment, and which is used for another user equipment, on the reference allocation information, and
wherein the layer information includes
information indicating a total number of transmission layers transmitted on the predetermined resource area, and
information specifying the one or more transmission layers for the user equipment among the transmission layers transmitted on the predetermined resource area.

9. The user equipment of claim 8, wherein the processor is configured to null-process the second reference signal pattern.

10. The user equipment of claim 8, wherein the layer information includes a number of the one or more transmission layers for the user equipment and information indicating a starting transmission layer among the one or more transmission layers for the user equipment.

* * * * *